United States Patent [19]

Shimada

[11] Patent Number: 5,537,251
[45] Date of Patent: Jul. 16, 1996

[54] ROTATING SCREEN PICTURE DISPLAY APPARATUS

[75] Inventor: Satoshi Shimada, Kanagawa, Japan

[73] Assignee: Sony Corporation, Tokyo, Japan

[21] Appl. No.: 210,753

[22] Filed: Mar. 22, 1994

[30] Foreign Application Priority Data

Mar. 23, 1993 [JP] Japan .................................... 5-064112

[51] Int. Cl.$^6$ .............................. G02B 27/22; G09G 1/08
[52] U.S. Cl. ............................. 359/462; 359/479; 345/13
[58] Field of Search ............................. 359/32, 462, 463, 359/464, 465, 466, 467, 468, 475, 477, 470, 471; 348/42, 51; 345/10–29

[56] References Cited

U.S. PATENT DOCUMENTS

| | | |
|---|---|---|
| 2,449,542 | 9/1948 | Ayres et al. .............................. 359/464 |
| 4,245,321 | 1/1981 | Gennetten .............................. 364/521 |
| 4,830,445 | 5/1989 | Robinson .............................. 359/32 |
| 5,148,310 | 9/1992 | Batchko .............................. 359/462 |

Primary Examiner—Paul M. Dzierzynski
Assistant Examiner—Audrey Y. Chang
Attorney, Agent, or Firm—Pasquale Musacchio; Jerry A. Miller

[57] ABSTRACT

A picture display apparatus includes a picture generating device for generating a rotating picture and a screen rotating on a rotary axis. A first mirror turns on the rotary axis and reflecting a picture generated by the picture generating device. A second mirror reflects the picture reflected by the first mirror to the screen. Further a projection lens disposed between the picture generating device and the first mirror projects the picture to the screen.

3 Claims, 38 Drawing Sheets

ROTATING SCREEN PICTURE DISPLAY APPARATUS

FIELD OF THE INVENTION

This invention relates to a picture display apparatus utilized for displaying a stereoscopic picture or a picture on a spherical screen.

BACKGROUND OF THE INVENTION

Stereoscopic picture recording devices are known in the art. One such device is disclosed in Laid Open Japanese Patent Hei 3-48233. Referring to FIG. 38, this device includes a controller and a driving device 103 for rotating a turning table 102. The driving device 103 is controlled by a start signal output from the controller 105 which causes the turning table 102 to rotate at a certain frequency. A left eye camera 106 and a right eye camera 107 shoot stereoscopic images 101a, 101b and 101c. Image signals for the right eye $E_R$ and image signals for the left eye $E_L$ corresponding to the stereoscopic images 101a, 101b and 101c are respectively output from the left eye camera 106 and the right eye camera 107 and recorded by recording apparatus 104. Panoramic stereoscopic images 101a–101c of 360° shot by the left eye camera 106 and the right eye camera 107 are then recorded on a master recording medium 104a. However, such devices have disadvantages. One disadvantage is that a user must undesirably wear polarized light eyeglasses in order to be able to view a stereoscopic picture using the images provided by the left 106 and right 107 eye cameras. In addition, the stereoscopic pictures which are produced by such devices do not provide wireframe representations in which elements within a structure and the structure itself may be viewed simultaneously. One such wireframe representation is illustrated in FIG. 2, which depicts a wireframe representation of a cylinder 108 within a rectangular block 109. Therefore, there is a need in the art for a device which provides a wireframe representation of an object in a stereoscopic picture.

SUMMARY OF THE INVENTION

One object of this invention is to provide a picture display apparatus and a revolving picture display apparatus which is utilized for displaying a stereoscopic picture or a picture on a spherical screen.

According to a first embodiment of this invention, a picture display apparatus includes a picture generating device for generating a rotating picture and a screen rotating on a rotary axis. A first mirror turns on the rotary axis and reflects a picture generated by the picture generating device. A second mirror reflects the picture reflected by the first mirror to the screen. Further a projection lens disposed between the picture generating device and the first mirror projects the picture to the screen.

DETAILED DESCRIPTION OF THE INVENTION

Figure 1:
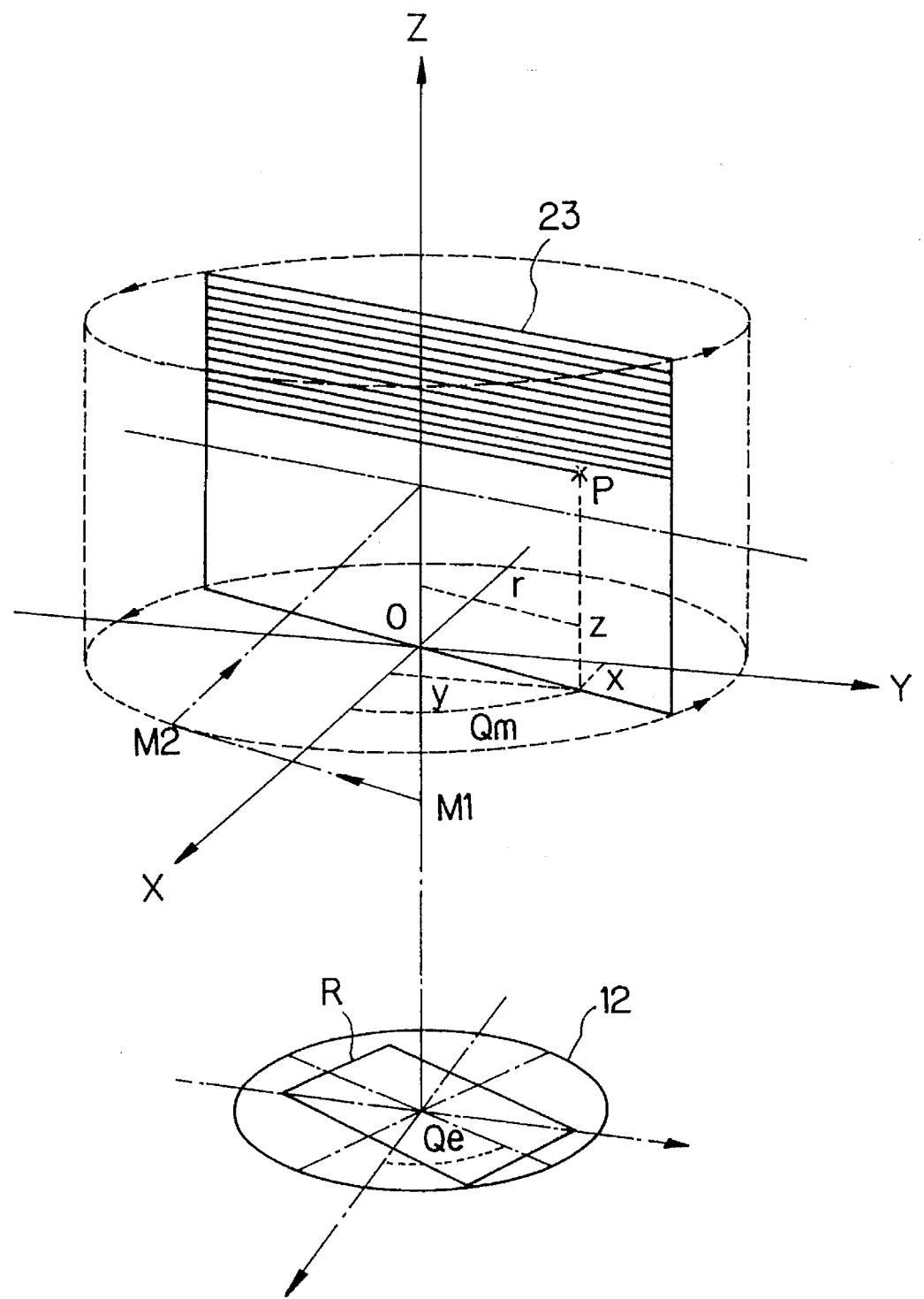
FIG. 1 is a view explaining a principle of a picture display apparatus of this invention.

At first making reference to FIG. 1, a principle of picture display apparatus in this invention is explained. A screen 23 turns on Z axis in a certain frequency as shown in FIG. 1. A cathode ray tube (CRT) 12 is disposed perpendicularly to this Z axis. A picture of raster R displayed on this CRT 12 is reflected by a mirror M1 (which corresponds to a mirror 21 in FIG. 3). The picture of raster R is then reflected by mirror M2 (which corresponds to a mirror 22 in FIG. 3) and is then projected on the screen 23.

Scanning lines which form raster R on the CRT 12 are projected on the screen 23. The screen 23 is at a position having an angle of Qm to the X axis in FIG. 1. The position of a point P presently being scanned is defined by points of x, y, z on XYZ coordinate. The distance from the point P to Z axis is r.

The raster R is displayed on the CRT 12. This raster R is rotated at a predetermined frequency (this frequency is equal to the rotary frequency of the screen 23). The raster R is at a position having an angle of Qe to the X axis in FIG. 1.

Figure 2:
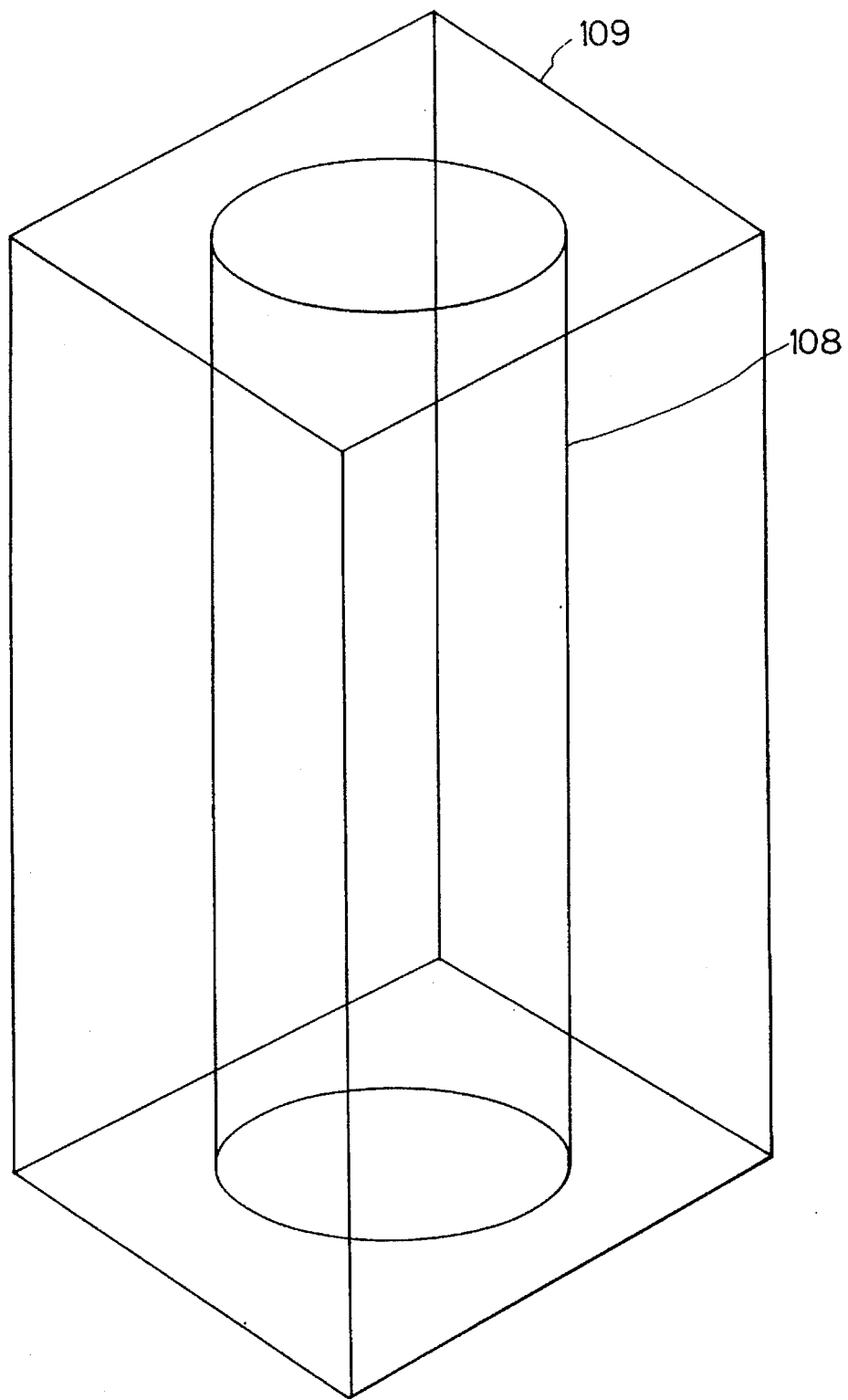
FIG. 2 is a view showing an example of a stereoscopic picture displayed by a picture display apparatus of this invention.

When the raster R displayed on the CRT 12 is projected on the screen 23 and the CRT 12 and the screen 23 are rotated at a high frequency, a stereoscopic picture of the picture displayed on the screen 23 is produced having a wireframe representation. By way of example, one such wireframe representation is illustrated in FIG. 2, which depicts a wireframe representation of the cylinder 108 within a rectangular block 109. Such wireframe representations enable the simultaneous viewing of elements within a structure and the structure itself.

Therefore, structures such as an automobile may be displayed simultaneously with internal components of the automobile such as its engine, chassis, seats and others. A picture formed by a image processing of a computer is used for displaying on the CRT 12.

Figure 3:
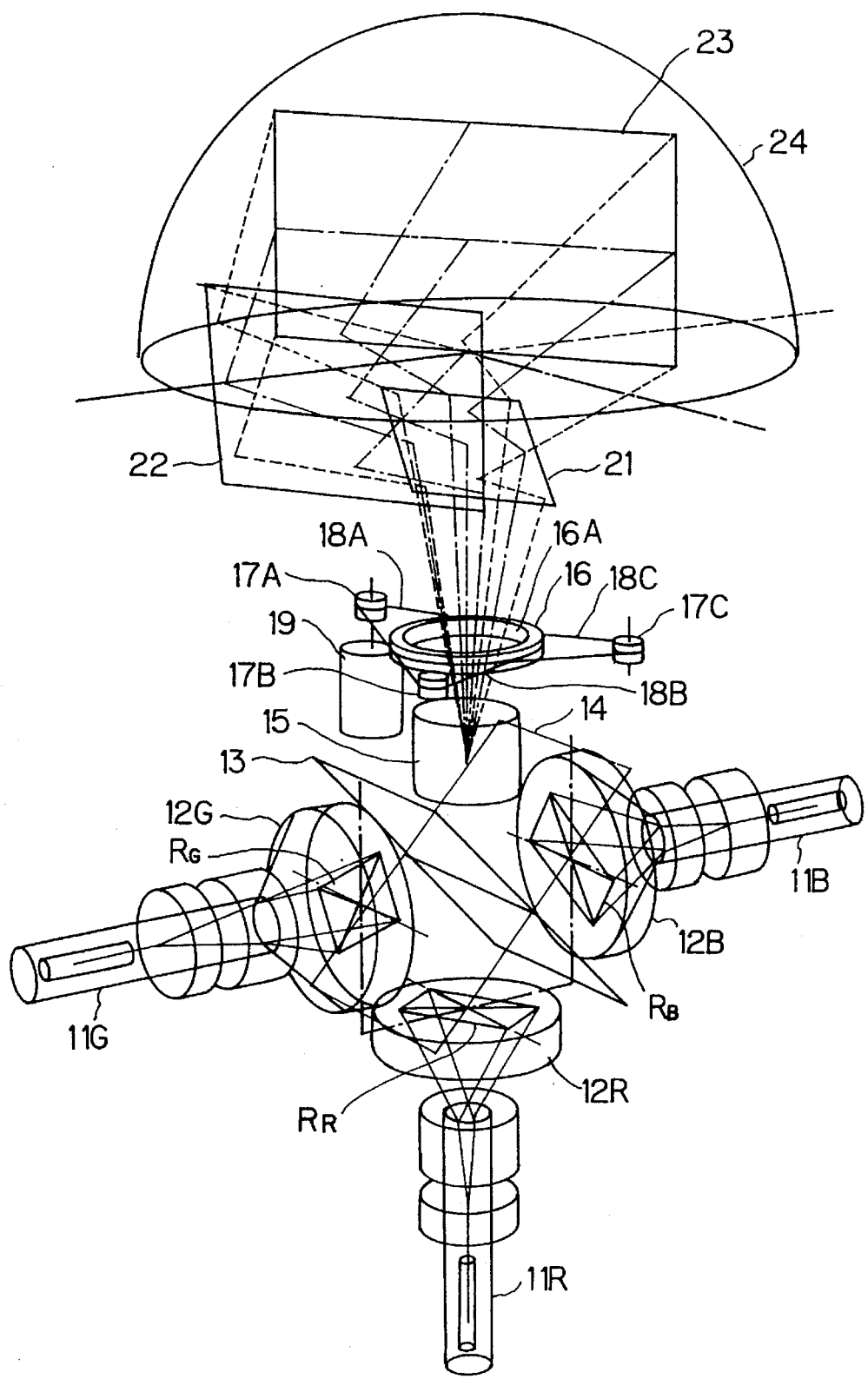
FIG. 3 is an perspective view showing a first example of a picture display apparatus of this invention.
Figure 4:
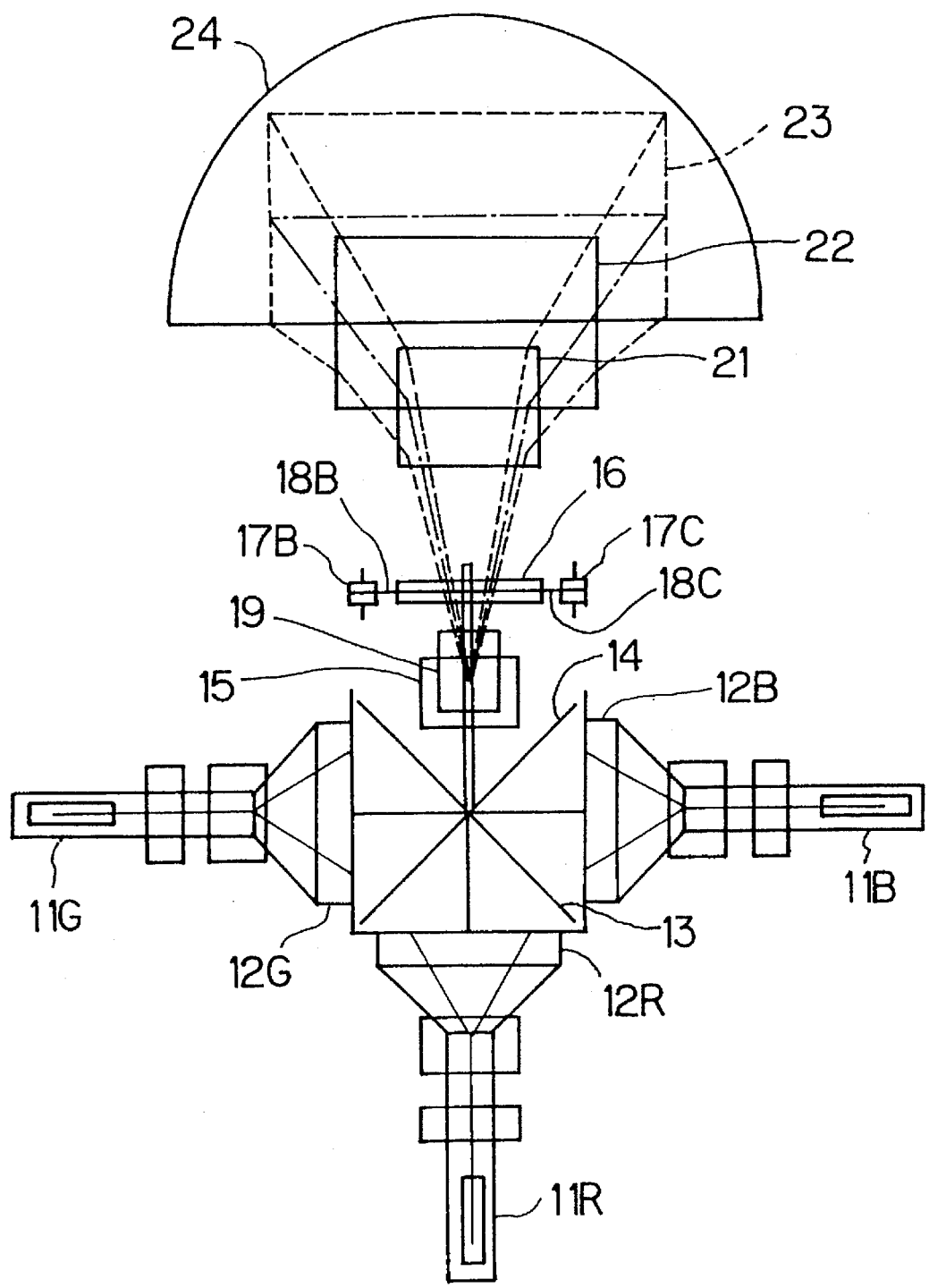
FIG. 4 is a front view showing the example of FIG. 3.
Figure 5:
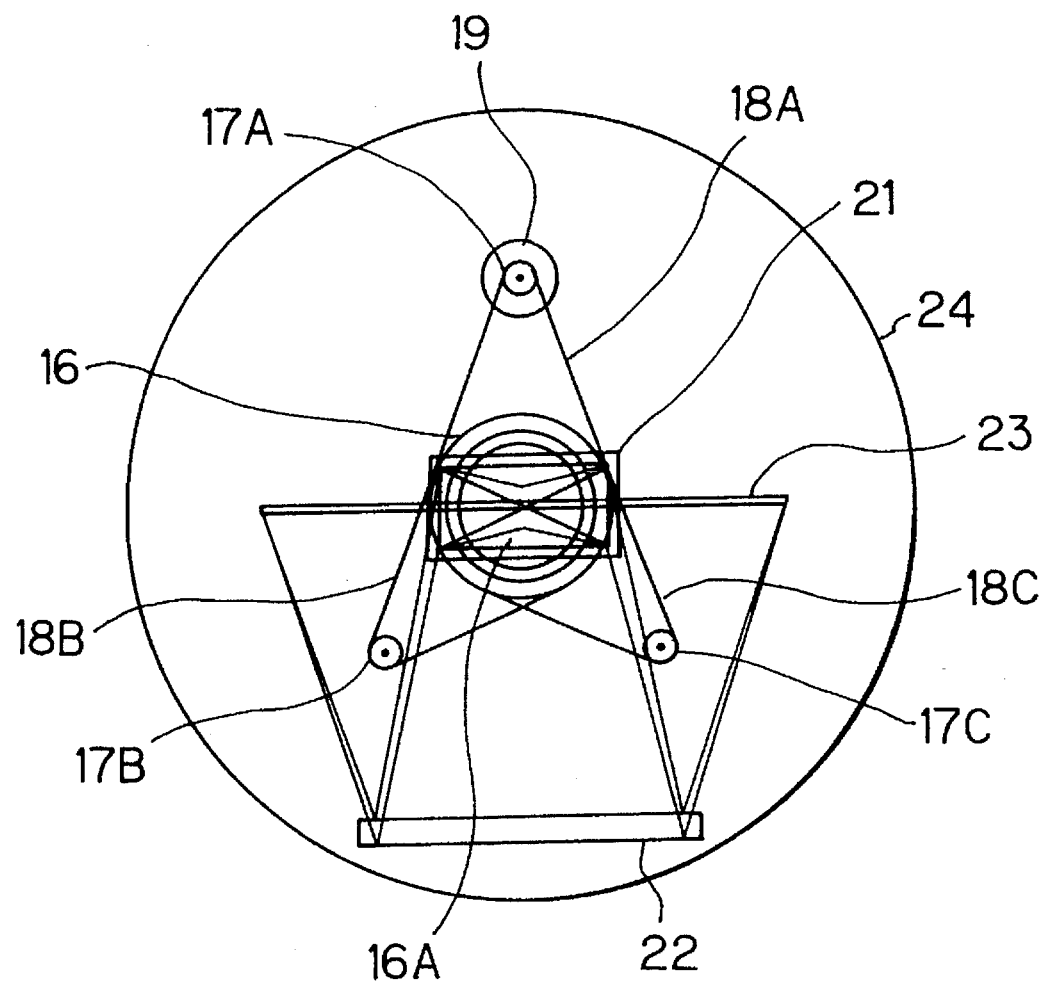
FIG. 5 is a plan view showing the example of FIG. 4.
Figure 6:
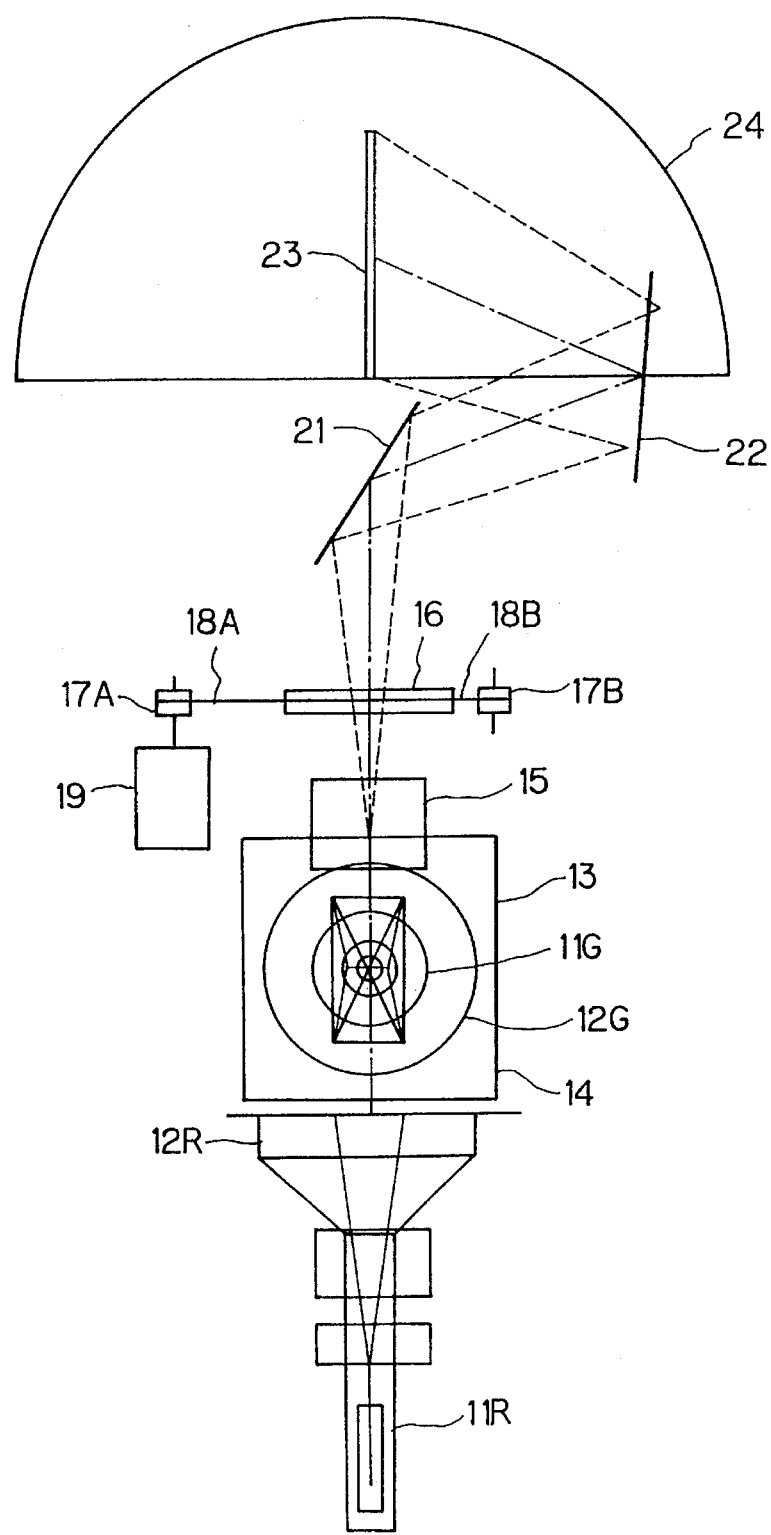
FIG. 6 is a left side view showing the example of FIG. 3.
Figure 7:
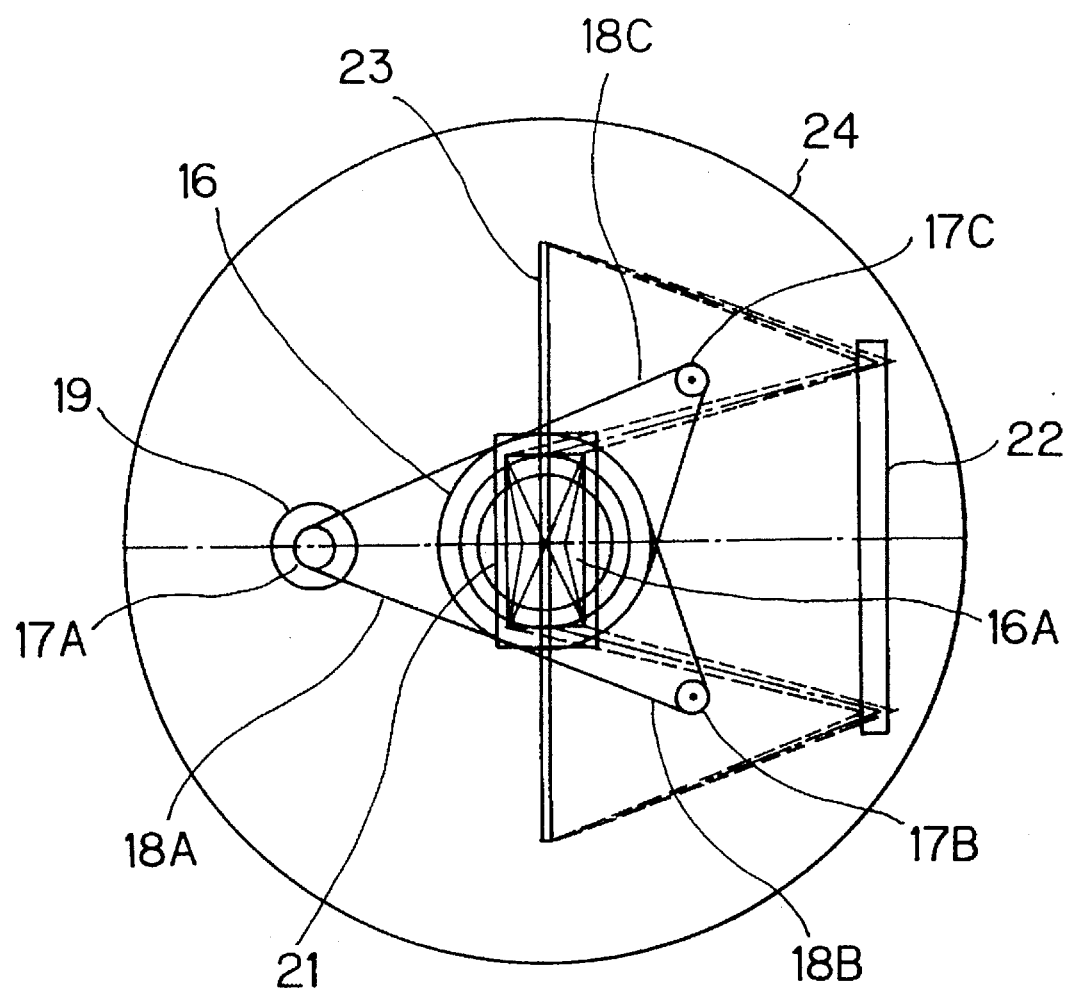
FIG. 7 is a plan view showing the example of FIG. 6.
Figure 8:
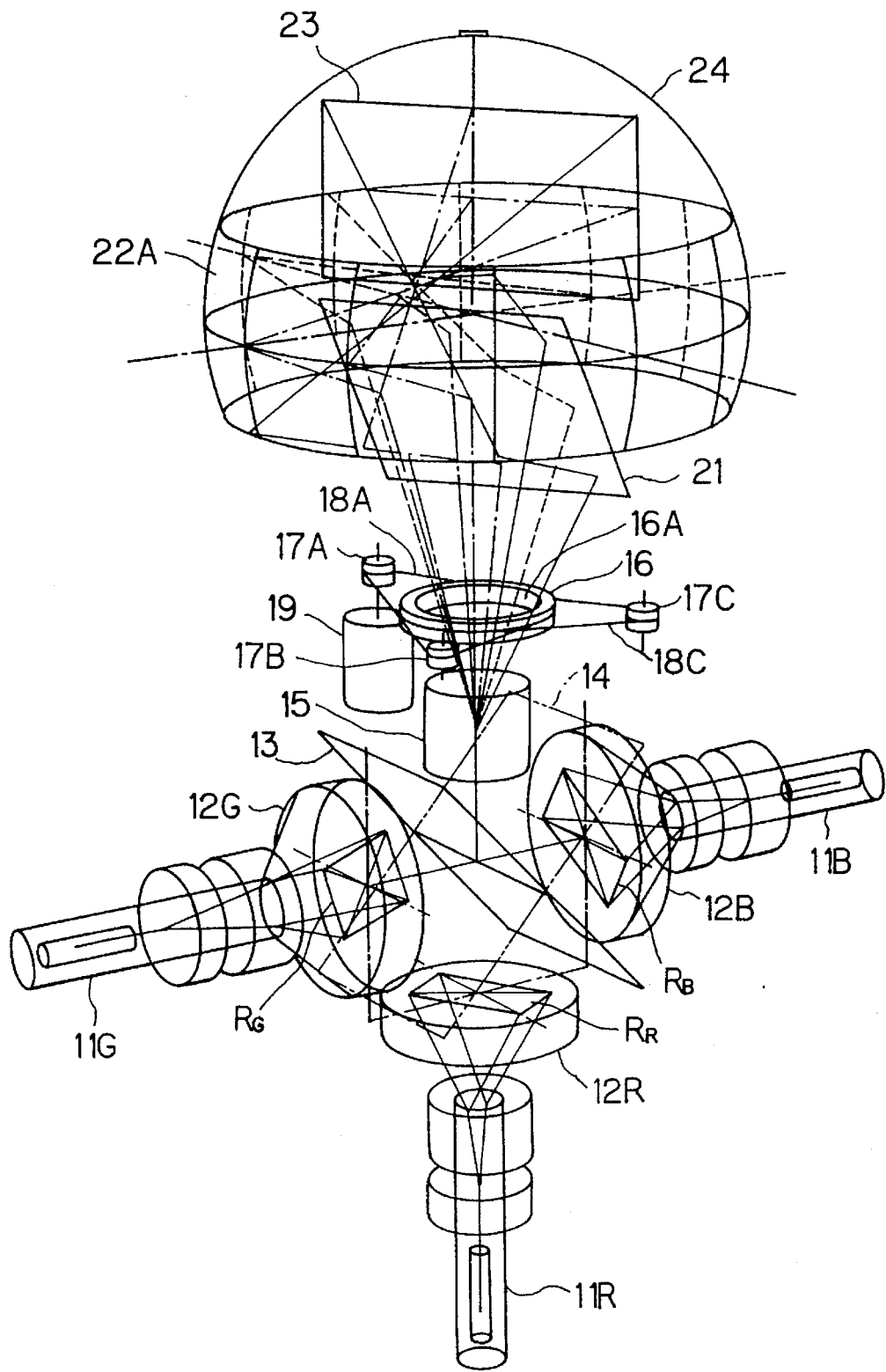
FIG. 8 is an perspective view showing a second example of a picture display apparatus of this invention.
Figure 9:
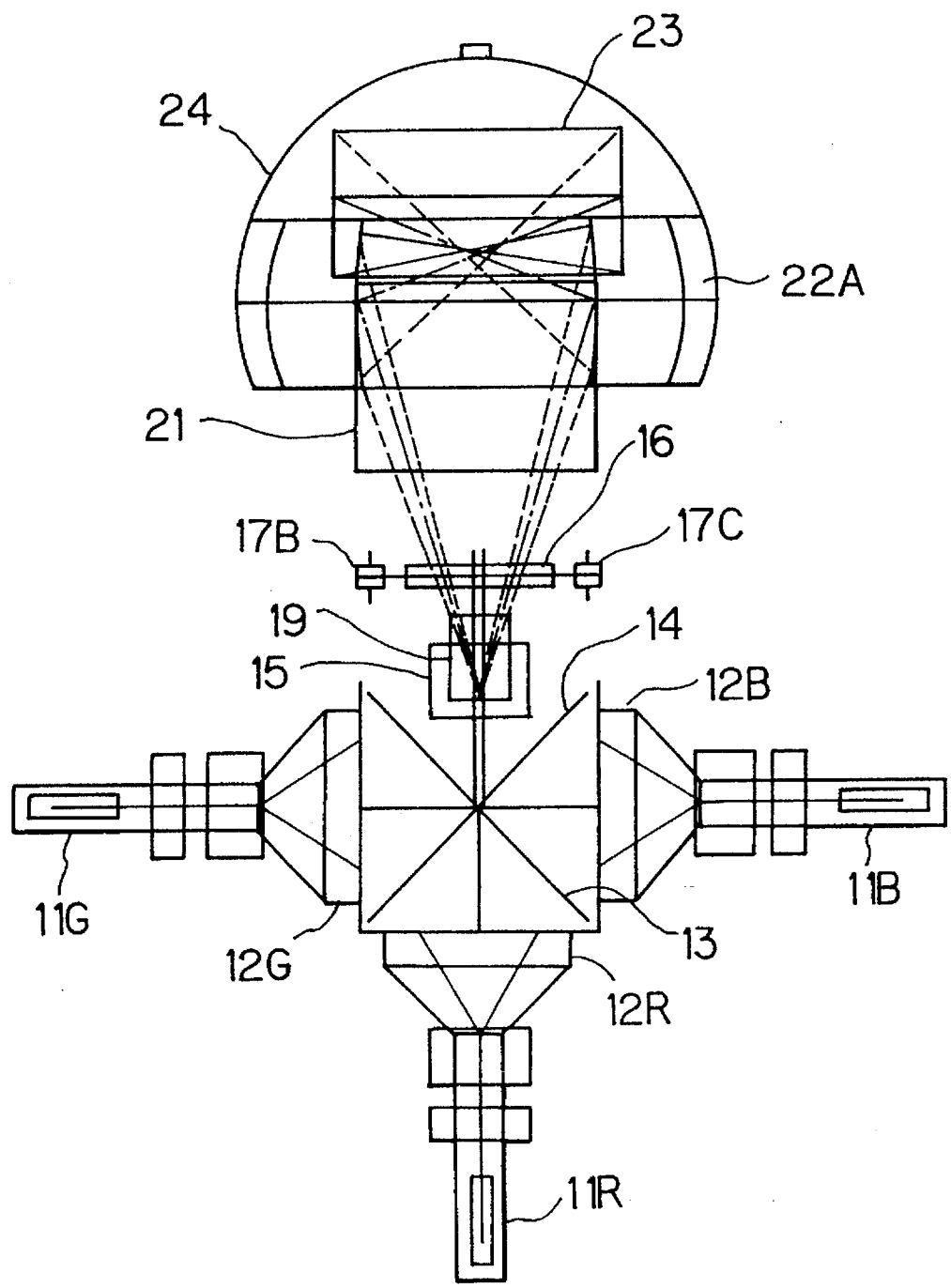
FIG. 9 is a front view showing the example of FIG. 8.
Figure 10:
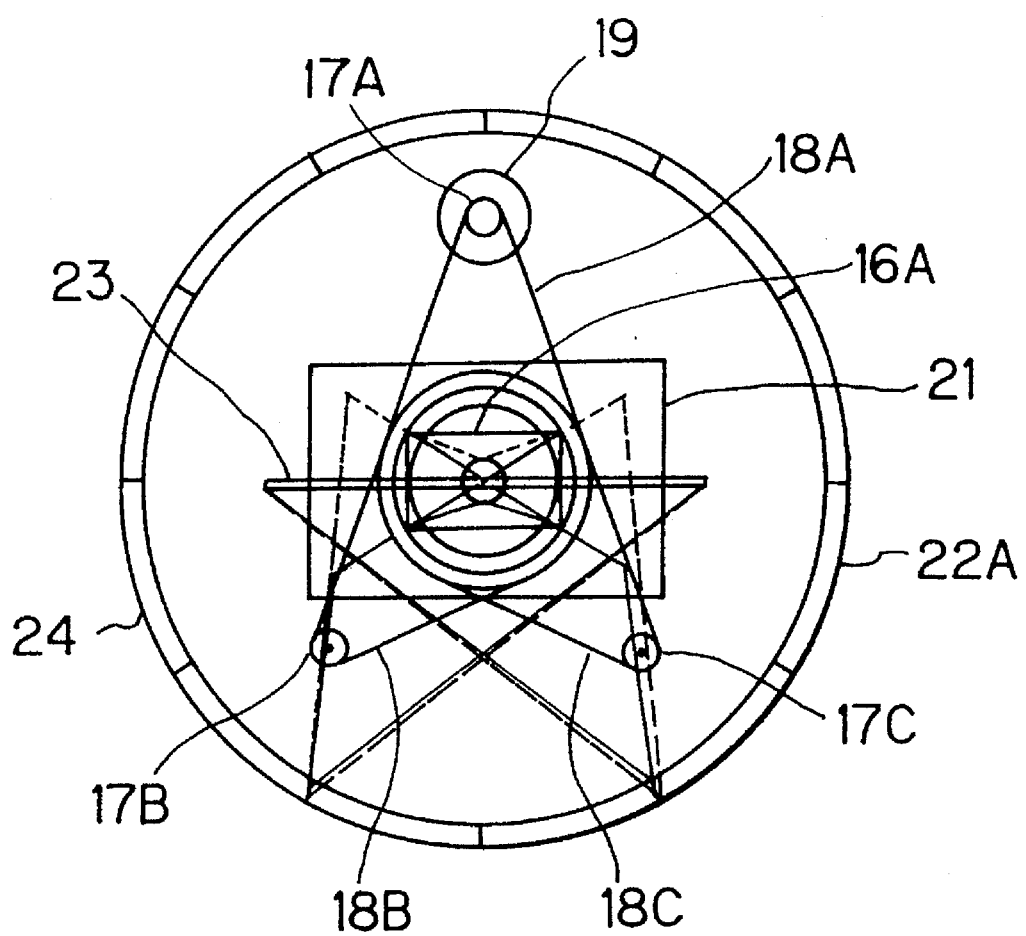
FIG. 10 is a plan view showing the example of FIG. 9.
Figure 11:
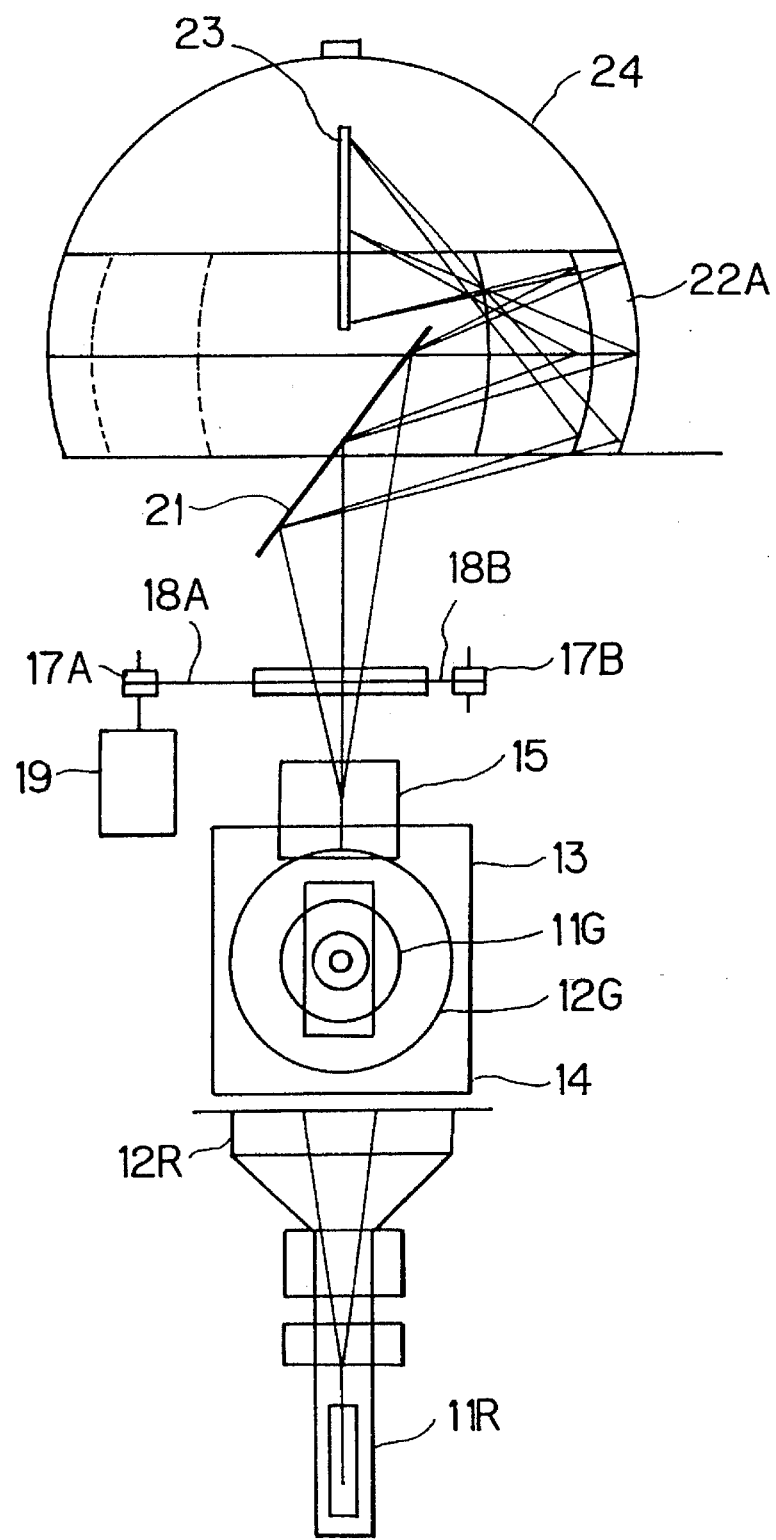
FIG. 11 is a left side view showing the example of FIG. 8.
Figure 12:
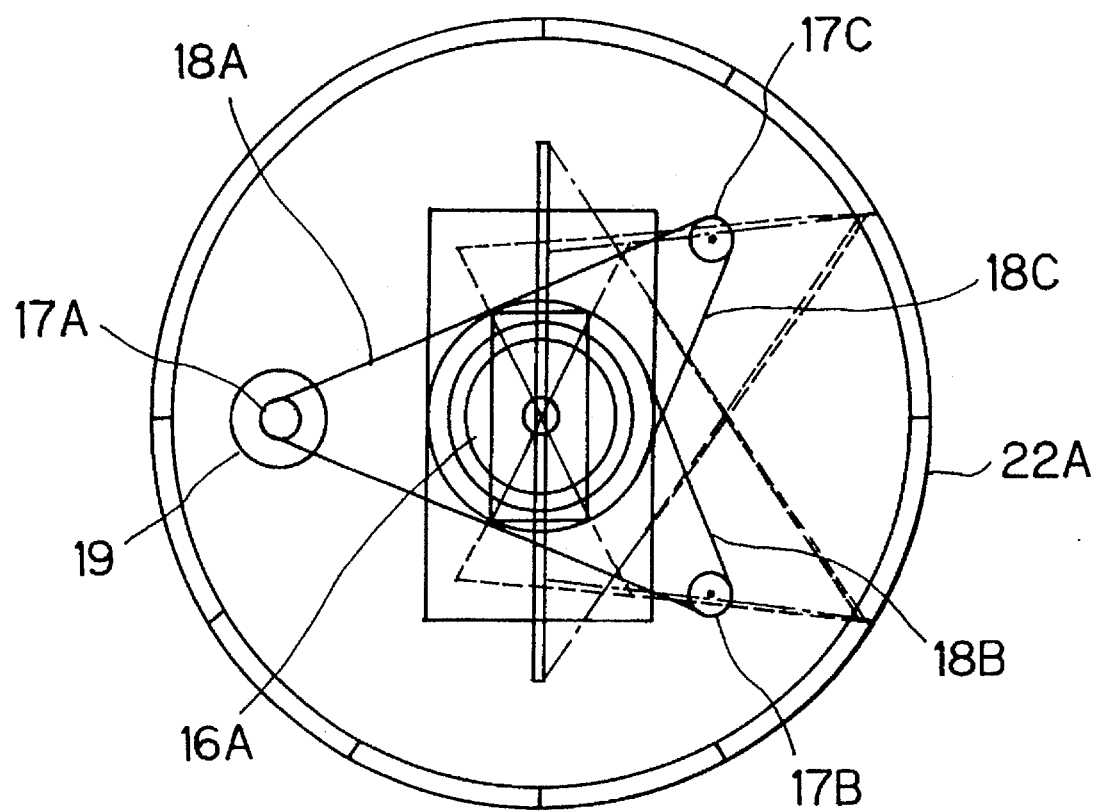
FIG. 12 is a plan view showing the example of FIG. 11.

FIG. 3 is an perspective view showing a first example of a picture display apparatus of this invention. FIG. 4 is a front view of the same. FIG. 5 is a plan view of FIG. 4. FIG. 6 is a left side view of FIG. 4. FIG. 7 is a plan view of FIG. 6.

A CRT 12R displays a picture made by an electron beam emitted from an electron gun 11R. The CRT 12R is disposed over the electron gun 11R and perpendicular to the electron gun 11R. A CRT 12G displays a picture made by an electron beam emitted from an electron gun 11G. The CRT 12G is disposed parallel with the electron gun 11G. A CRT 12B displays a picture made by an electron beam emitted from an electron gun 11B. The CRT 12B is disposed parallel with the electron gun 11B. The CRT 12G and the CRT 12B are put on the same straight line and face each other.

A dichroic mirror 13 is combined with a dichroic mirror 14 crossing perpendicular to each other. The dichroic mirrors 13, 14 have an angle of 45° to a horizontal line and a vertical line. The dichroic mirror 13 reflects a blue light and passes through a red light and a green light. The dichroic mirror 14 reflects a green light and passes through a red light and a blue light. A red light emitted from an electron gun 11R, a blue light emitted from an electron gun 11B and a green light emitted from an electron gun 11G are synthesized thereby. The synthesized light is input to a projection lens 15.

The optical axis of this projection lens 15 is parallel with a vertical line and coincides with a rotary axis of an annular ring 16. Pulleys 17A, 17B and 17C are provided around the annular ring 16. Belts 18A, 18B and 18C are provided between each pulley 17A, 17B, 17C and the annular ring 16. The pulley 17A is rotated by a motor 19.

The annular ring 16 is coupled with the mirrors 21,22 and the screen 23 (not shown). So the mirrors 21,22 and the screen 23 rotate with the annular ring 16. The rotary axis of the annular ring 16 passes through the center of the mirror 21. The mirror 21 is provided having a predetermined angle to this rotary axis. The screen 23 is provided vertically. The rotary axis of the screen 23 coincides with the rotary axis of the annular ring 16.

A dome 24 is provided so as to cover the mirrors 21,22 and the screen 23. This dome 24 is fixed on a substrate not shown and does not revolve. In other words, the mirrors 21,22 and the screen 23 rotate freely in the dome 24.

Next, the operation is explained as follows. A red, green or blue picture (raster $R_R, R_G, R_B$) is respectively displayed on the respectively corresponding CRT 12R, 12G or 12B by the electron gun 11R, 11G or 11B. These rasters are synthesized by the dichroic mirrors 13 and 14 and input to the projection lens 15.

This synthesized picture passes through the projection lens 15 and is input to the mirror 21 through a hole 16A formed at the center of annular ring 16. The mirror 21 reflects the incident light to the mirror 22. The mirror 22 reflects the incident light to the screen 23. The synthesized picture is displayed on the screen 23 thereby.

A motor 19 drives the pulley 17A. The rotation of the pulley 17A is transferred to the annular ring 16 through the belt 18A. The annular ring 16, the mirror 21, the mirror 22 and the screen 23 are rotated together thereby. The annular ring 16 does not have a rotary axis. But because the annular ring 16 is rotated uniformly by the pulleys 17A, 17B and 17C provided radially in the three directions, it rotates smoothly.

The rasters $R_R, R_G, R_B$ displayed on the CRT 12R, 12G and 12B are also rotated electrically, synchronizing with the rotation of the screen 23. (An example of circuit for that is explained later, making reference to FIG. 32.) So the picture displayed on the screen 23 changes, corresponding to the rotary position of the screen 23. Because the screen 23 is rotated at a high speed (for example 30 Hertz(Hz)), an observer can not recognize the rotation of the screen 23. As a result, an observer recognizes the picture displayed on the screen 23 as a stereoscopic picture. The dome 24 is made of a transparent glass or plastic so that an observer can see the picture displayed on the screen 23 from outside of the dome 24. The dome 24 also has a protective function so that an observer can not contact the screen 23 revolving in high speed.

A second example is shown in from FIG. 8 to FIG. 12. A mirror 22A corresponding to the mirror 22 shown in the first example is attached to the inside wall of the dome 24. So the mirror 22A is a spherical mirror. The second example is the same as the first example except the mirror 22A.

Namely the mirror 21 reflects the light emitted from the projection lens 15 to the mirror 22A. The mirror 22A reflects the light to the screen 23. The mirror 21 and the screen 23 rotate with the annular ring 16. The dome 24 and the mirror 22A attached to the dome 24 do not rotate. The mirror 22A is formed wholly around the dome 24 like a ring. The light reflected by the mirror 21 is always projected to the screen 23 regardless of the rotary position of the mirror 21 and the screen 23 thereby.

Figure 13:
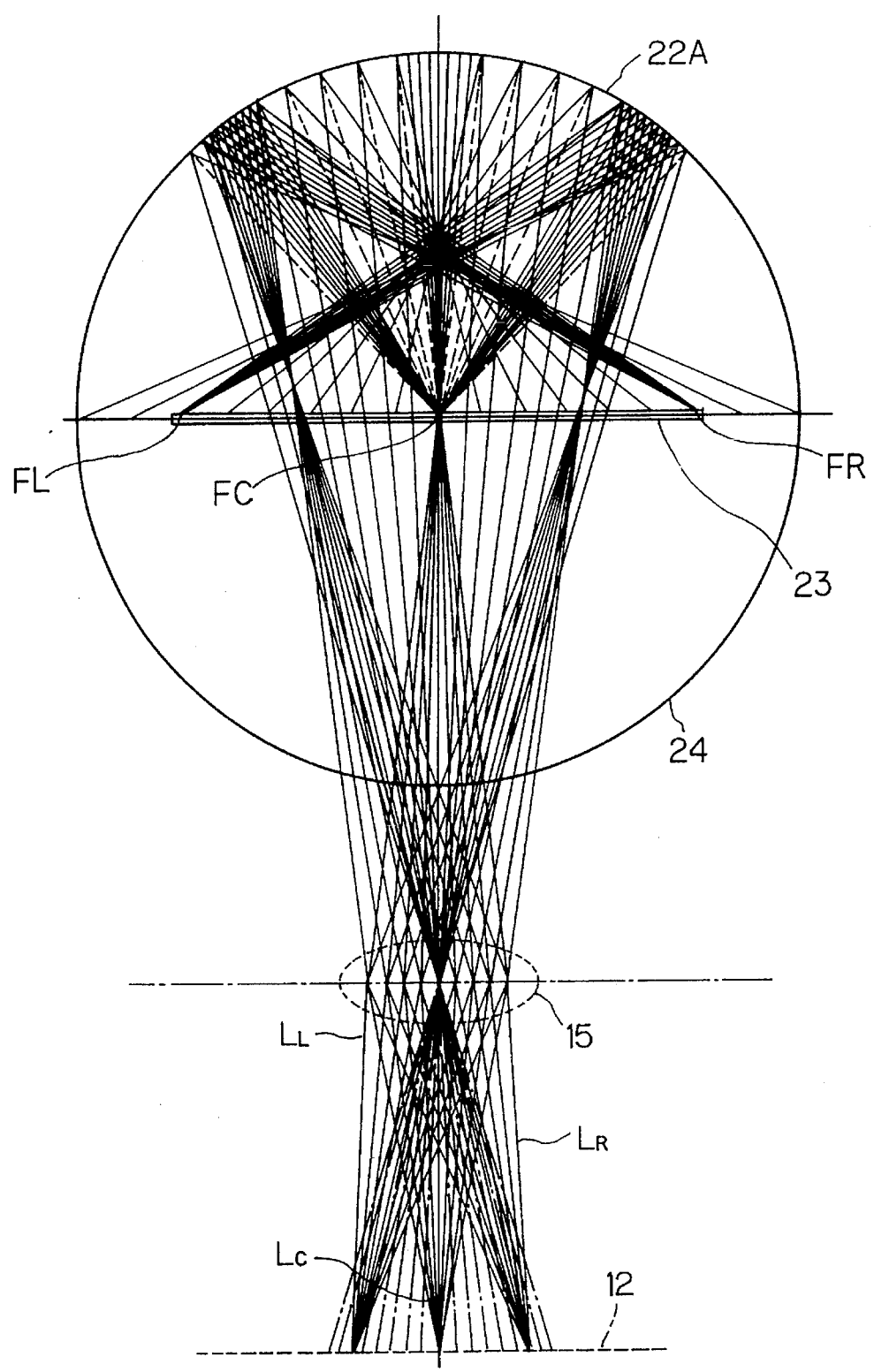
FIG. 13 is a plan view showing an ideal light pass of the example of FIG. 8.
Figure 14:
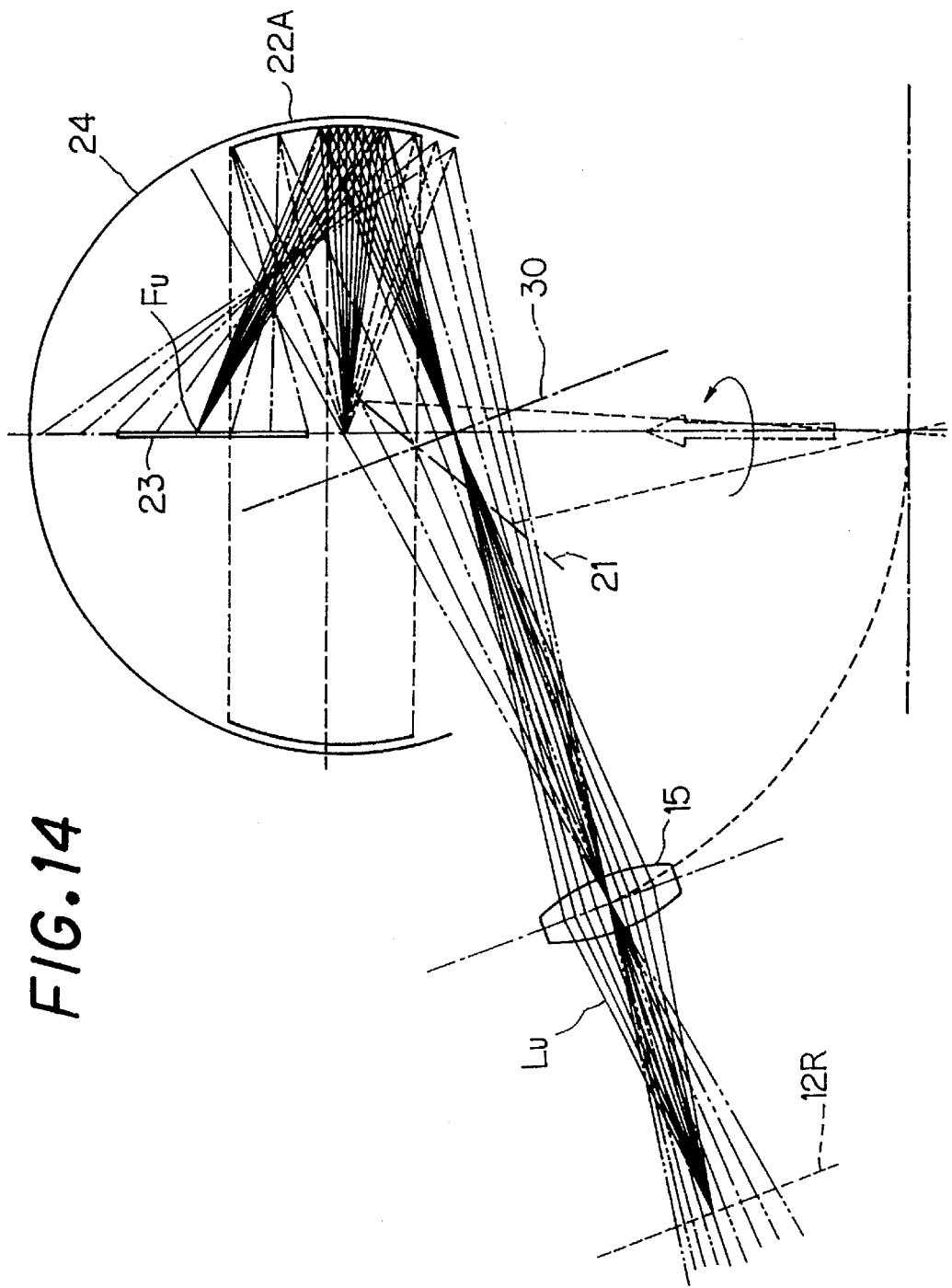
FIG. 14 is a side view showing an ideal light pass of the example of FIG. 8.

FIG. 13 and FIG. 14 show the optical path of the second example. FIG. 13 is its plan view. FIG. 14 is its side view. The CRT 12 and the projection lens 15 are provided at the conjugate position to the mirror 21 for convenience' sake of explanation.

The optical paths of the CRT 12B and the CRT 12G are the same as FIG. 13 and FIG. 14, though they are not shown in the figures.

The light $L_R$ emitted from the right side of the CRT 12R is input to the mirror 22A through the projection lens 15 as shown in FIG. 13. The light $L_R$ is reflected by the mirror 22A and focused at a right point $F_R$ on the screen 23. Similarly the light $L_L$ emitted from the left side of the CRT 12R is input to the mirror 22A through the projection lens 15. The light $L_L$ is reflected by the mirror 22A and focused at a left point $F_L$ on the screen 23. The light $L_C$ emitted from the center of the CRT 12R is input to the mirror 22A through the projection lens 15. The light $L_C$ is reflected by the mirror 22A and focused at a center point $F_C$ on the screen 23.

The light $L_U$ emitted from the upper side of the CRT 12R is focused on a middle focus line 30 through the projection lens 15 once. Then the light $L_U$ diffuses again. It is reflected by the mirror 22A and focused at an upper side $F_U$ on the screen 23.

Figure 15:
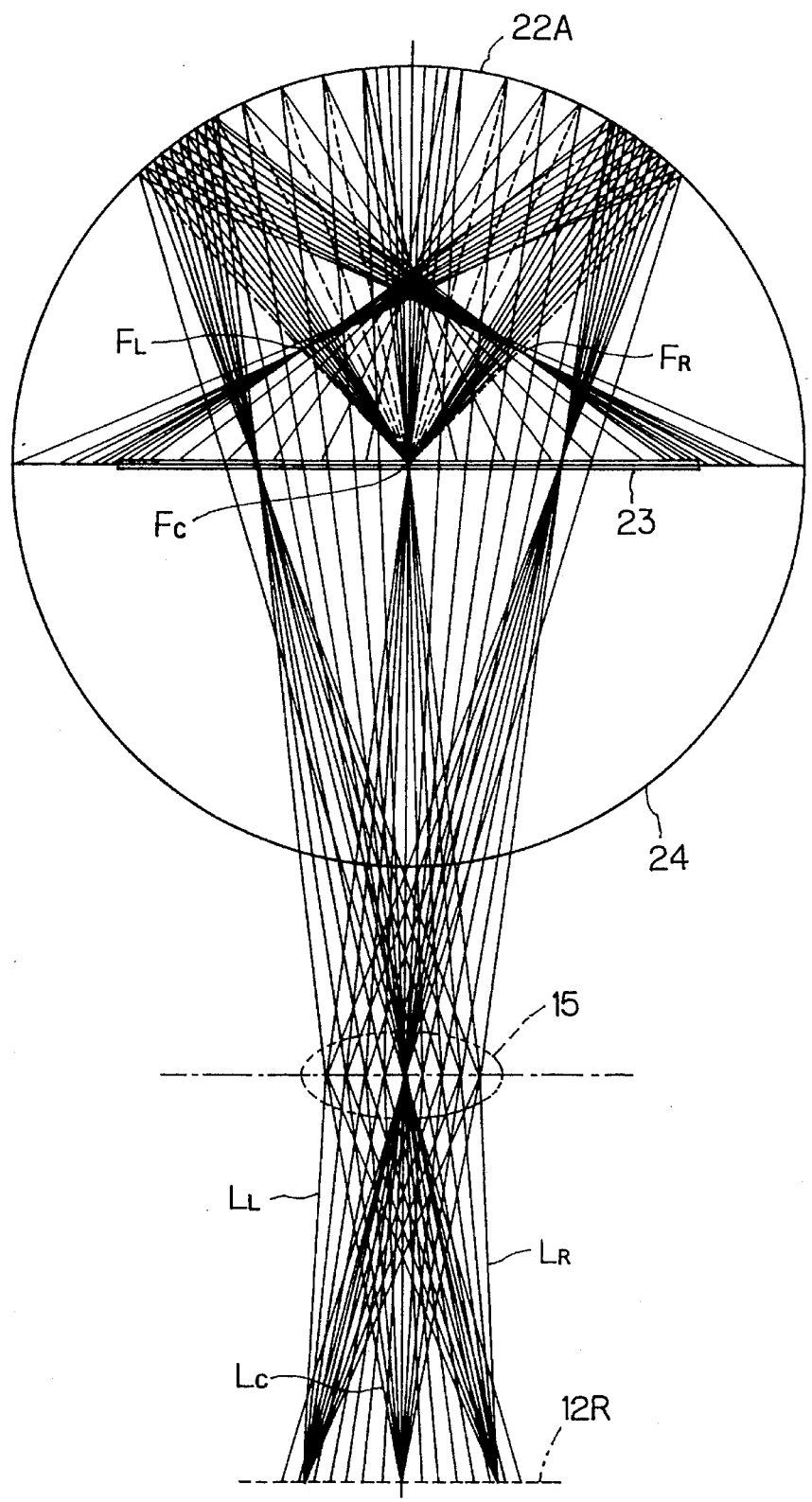
FIG. 15 is a plan view explaining a principle of a blur of a picture obtained by an example of FIG. 8.
Figure 16:
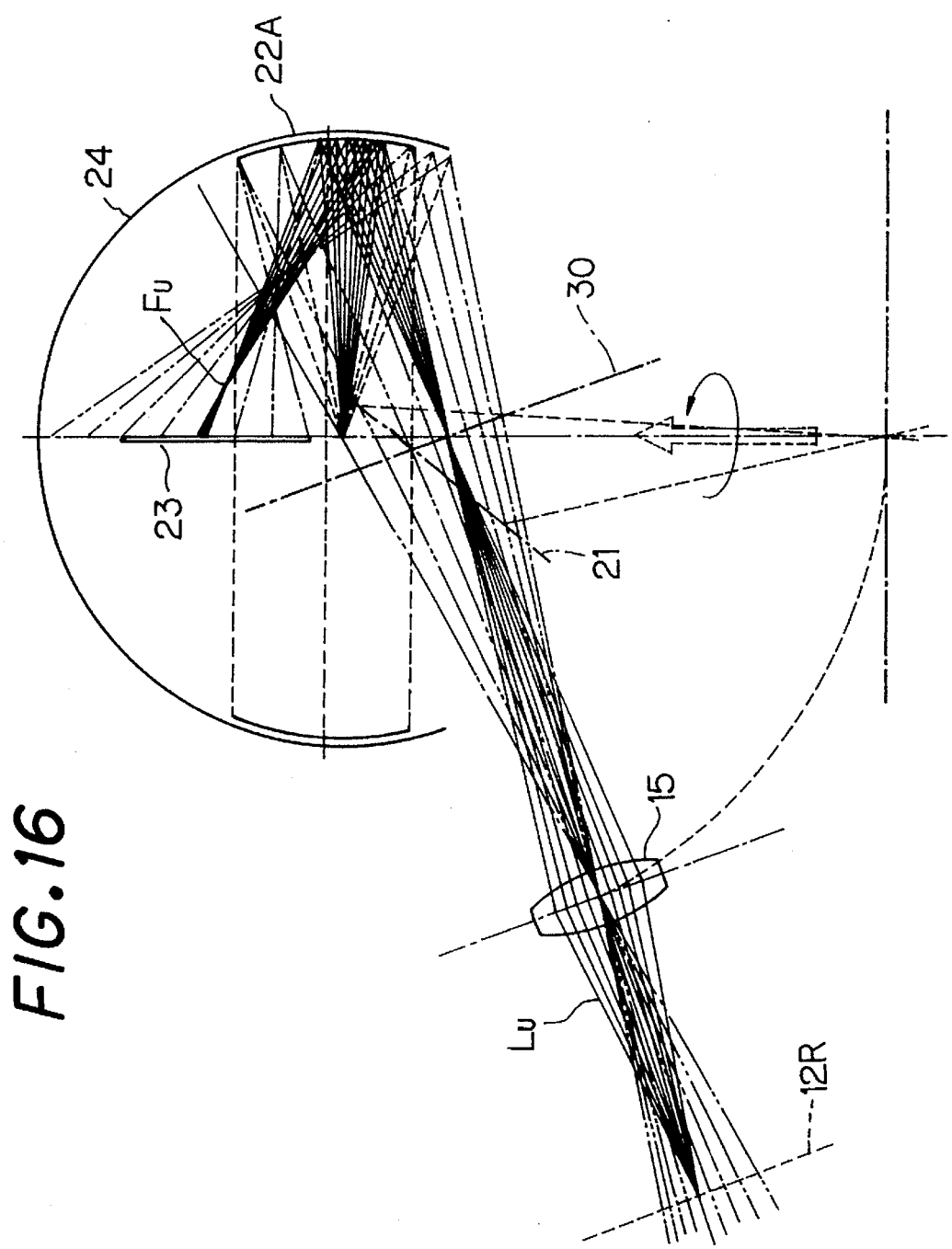
FIG. 16 is a side view explaining a principle of a blur of a picture obtained by an example of FIG. 8.

The above stated explanation assumes an ideal situation not considering a optical distance. But actually a blur appears because of a difference of optical path length as shown in FIG. 15 and FIG. 16. The optical path length of the light $L_R$ which is emitted from the right side of the CRT 12R and gets to the screen 23 or the light $L_L$ which is emitted from the left side of the CRT 12R gets to the screen 23 is longer than the optical path length of the light $L_C$ which is emitted from the center of the CRT 12R and gets to the screen 23. So when the projection lens 15 and the mirror 22A are disposed so as to put the focus point $F_C$ of the light $L_C$ emitted from the center of the CRT 12R on the screen 23, the focus point $F_R$ of the light $L_R$ emitted from the right side of the CRT 12R and the focus point $F_L$ of the light $L_L$ emitted from the left side of the CRT 12R are respectively set in front of the screen 23. As a result, the picture of right and left edge on the screen 23 blurs more than the picture of center part.

Similar blur appears at an upper and lower edge of the picture as shown in FIG. 16. When the projection lens 15 and the mirror 22A are disposed so as to put the focus point $F_C$ of the light $L_C$ emitted from the center of the CRT 12R on the screen 23, the light $L_U$ emitted from the upper side of the CRT 12R is focused on a middle focus line 30 through the projection lens 15 once. Then the light $L_U$ is reflected by the mirror 22A and focused at an upper side $F_U$. The focus point $F_U$ of the light $L_U$ is set in front of the screen 23. As a result, the picture of upper and lower edge on the screen 23 blurs more than the picture of center part.

Figure 17:
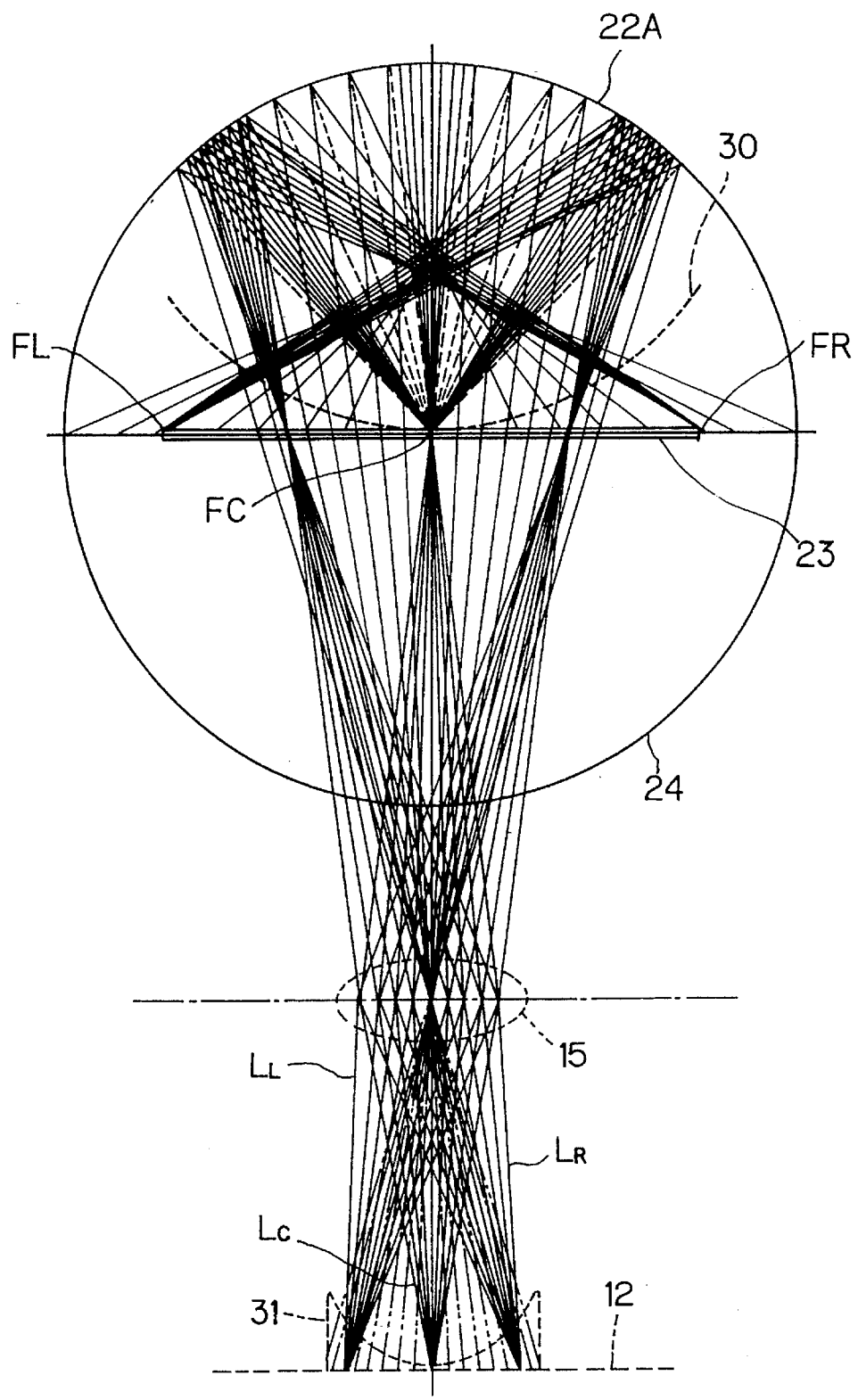
FIG. 17 is a plan view explaining a principle correcting a blur of a picture obtained by an example of FIG. 8.
Figure 18:
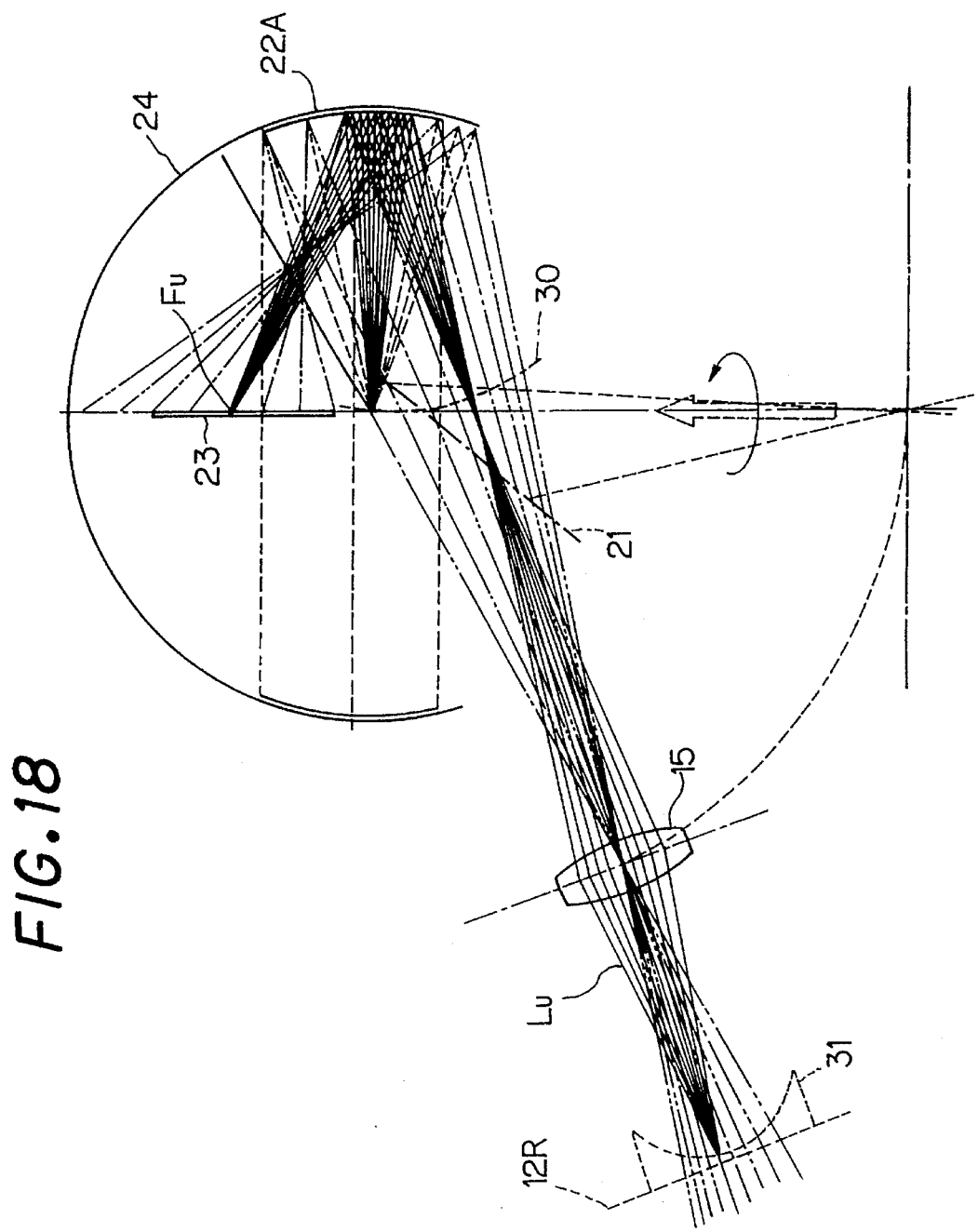
FIG. 18 is a side view explaining a principle correcting a blur of a picture obtained by an example of FIG. 8.
Figure 19:
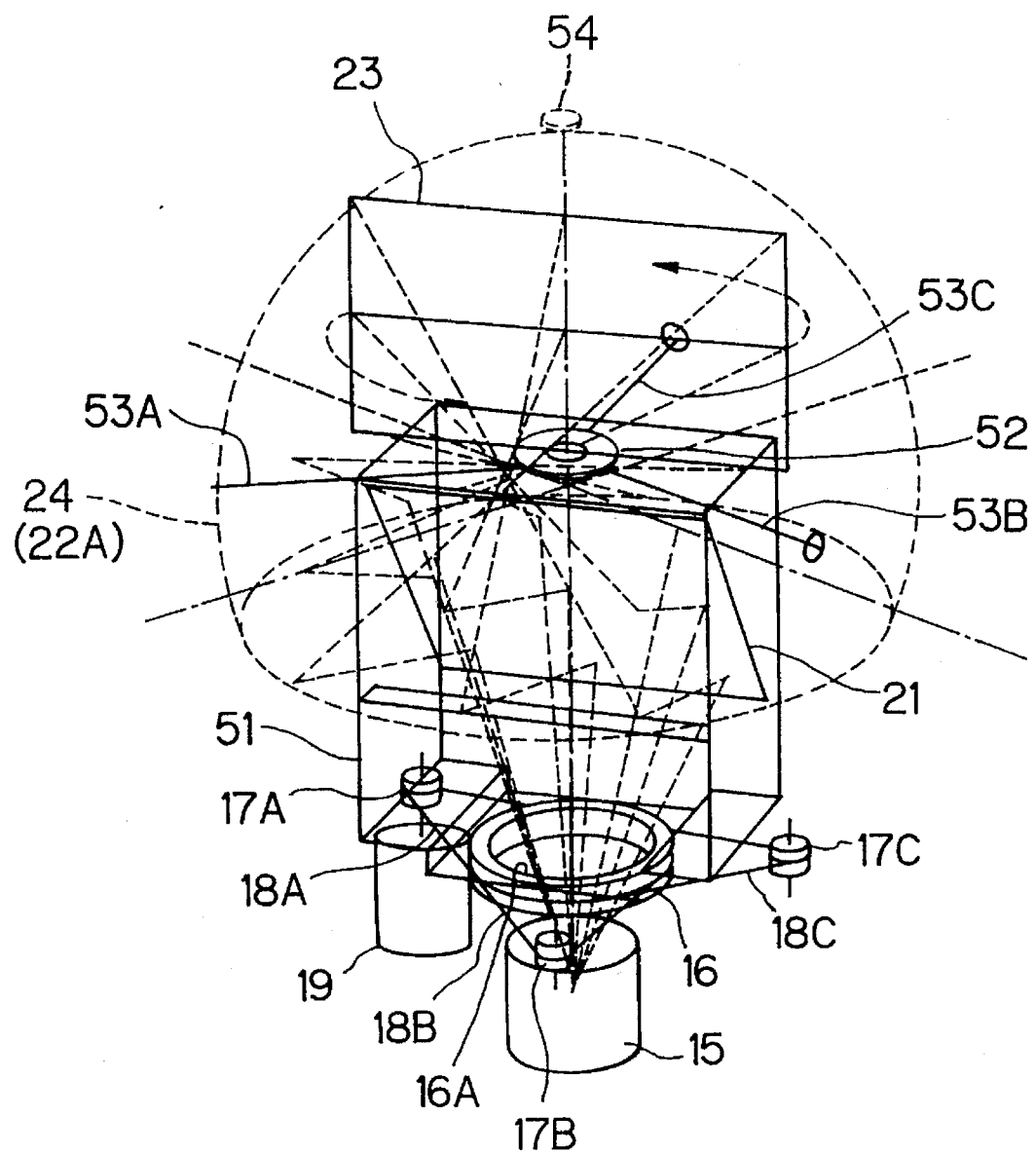
FIG. 19 is a perspective view showing a structure holding a mirror and a screen of a picture display apparatus of this invention.
Figure 20:
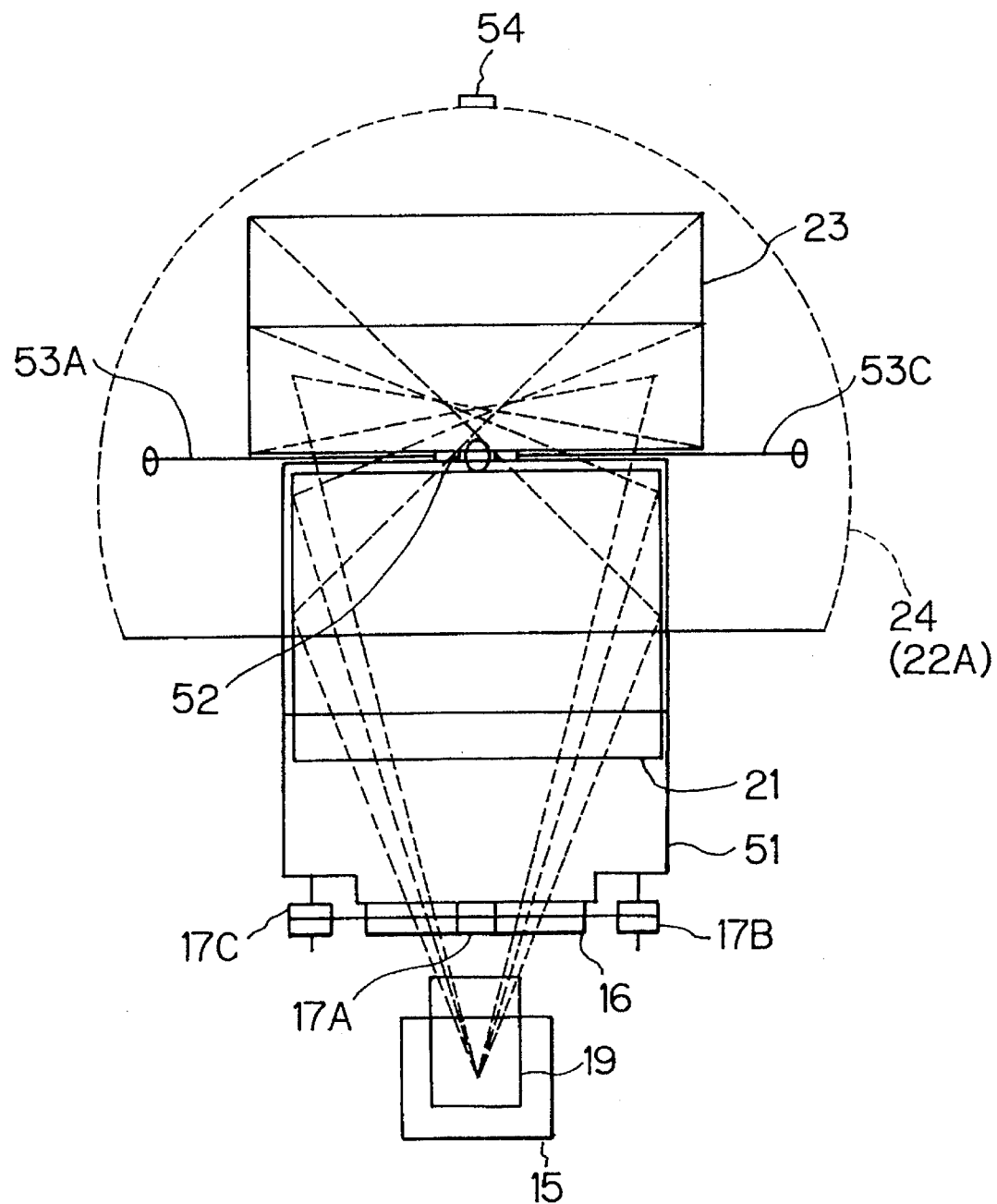
FIG. 20 is a front view showing the example of FIG. 19.
Figure 21:
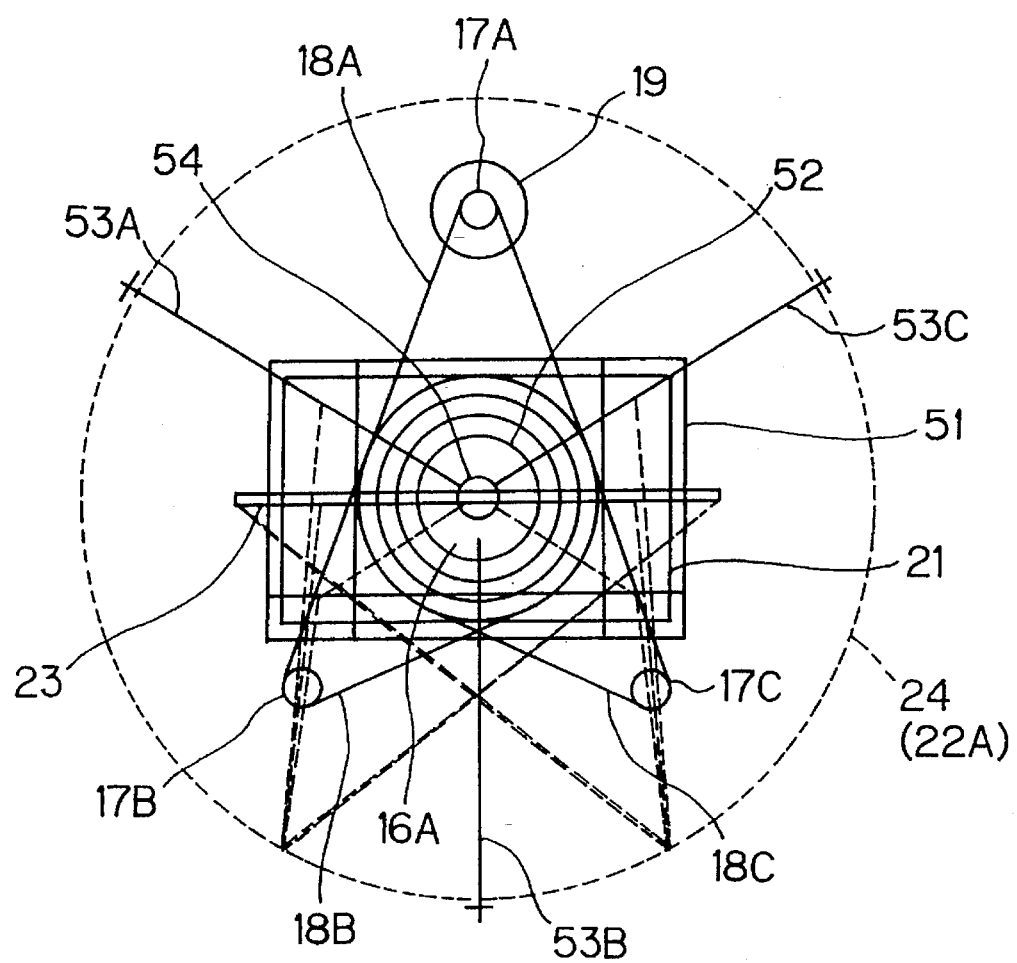
FIG. 21 is a plan view showing the example of FIG. 20.
Figure 22:
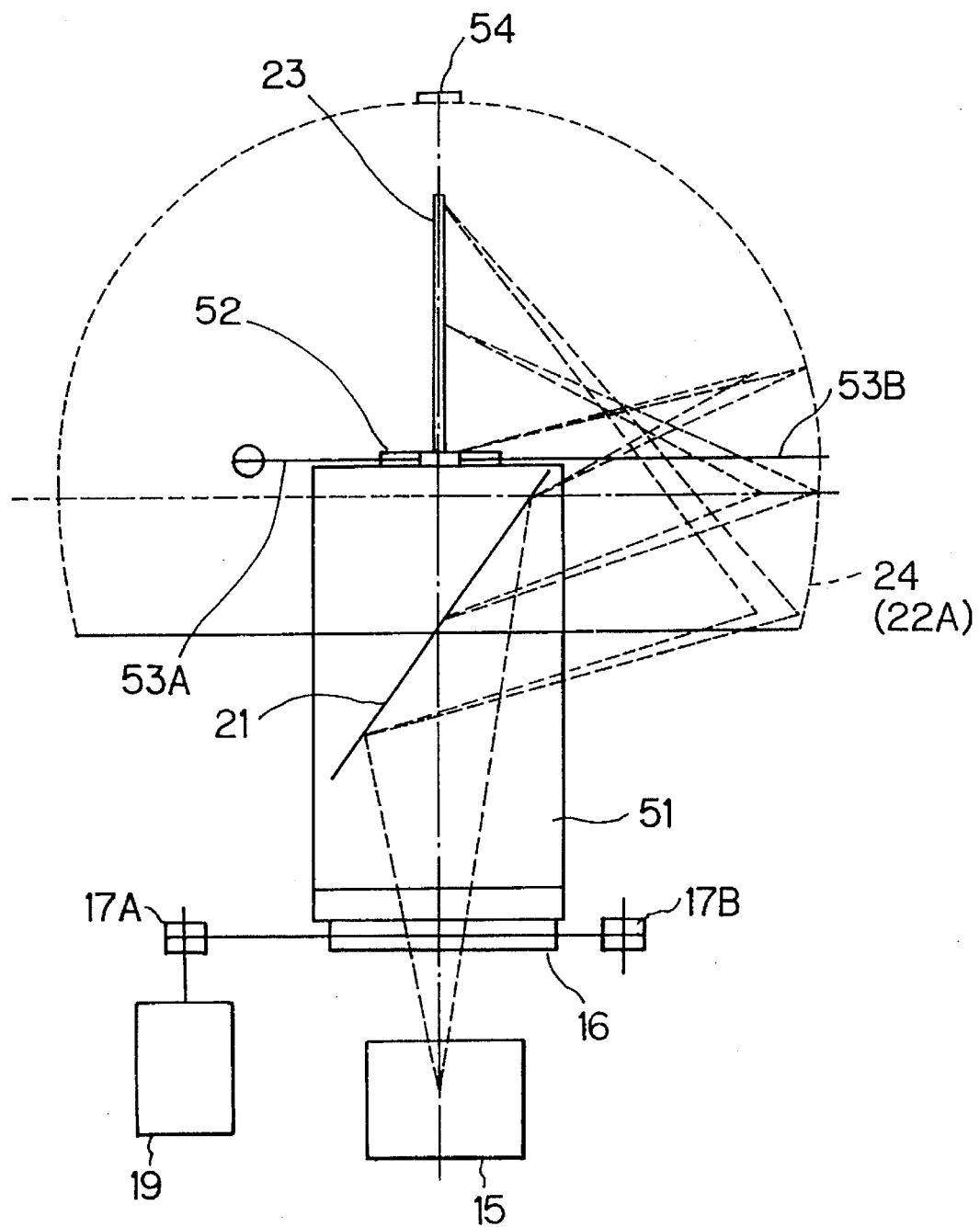
FIG. 22 is a side view showing the example of FIG. 19.
Figure 23:
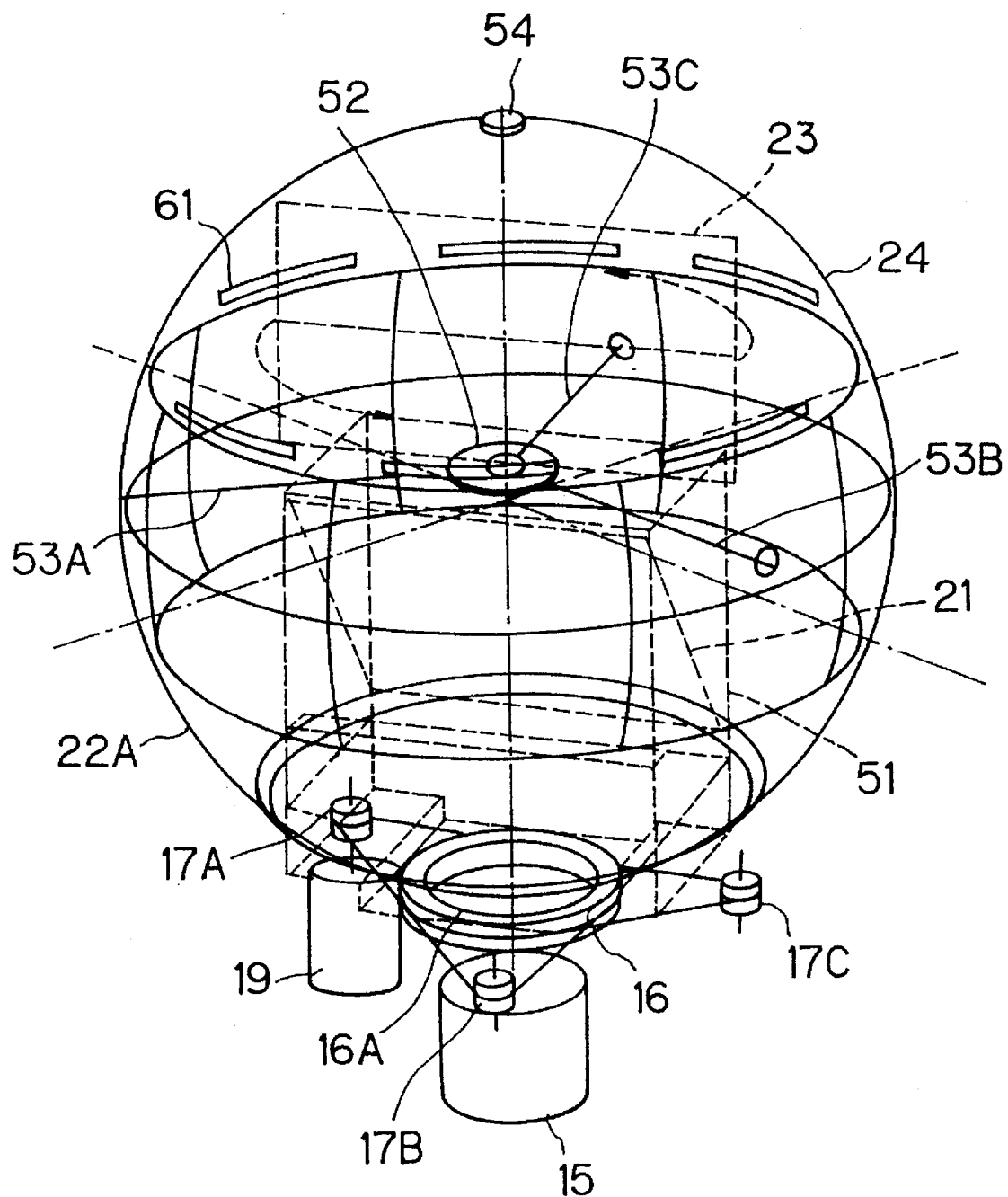
FIG. 23 is a perspective view showing another structure holding a mirror and a screen of a picture display apparatus of this invention.
Figure 24:
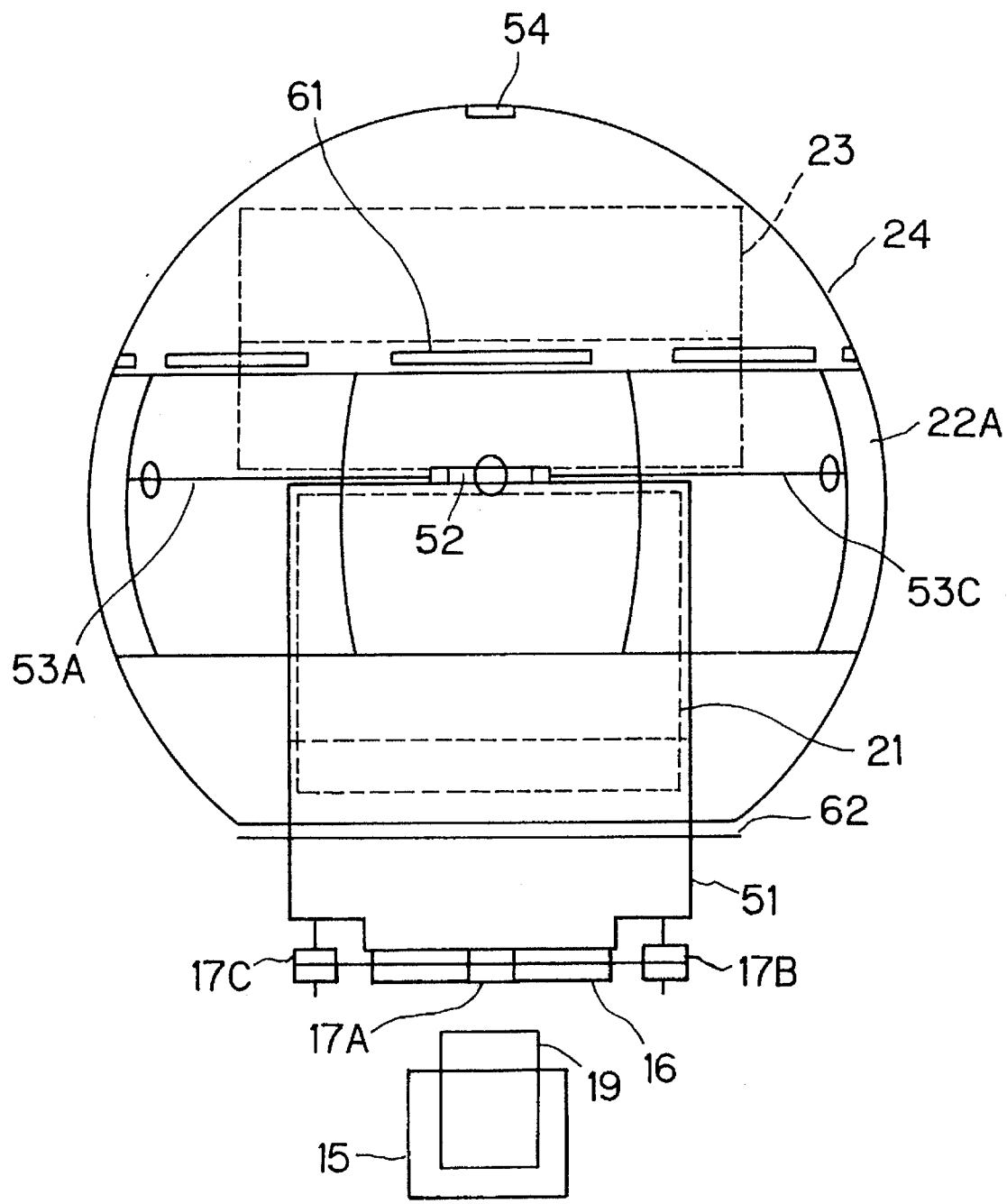
FIG. 24 is a front view showing the example of FIG. 23.
Figure 25:
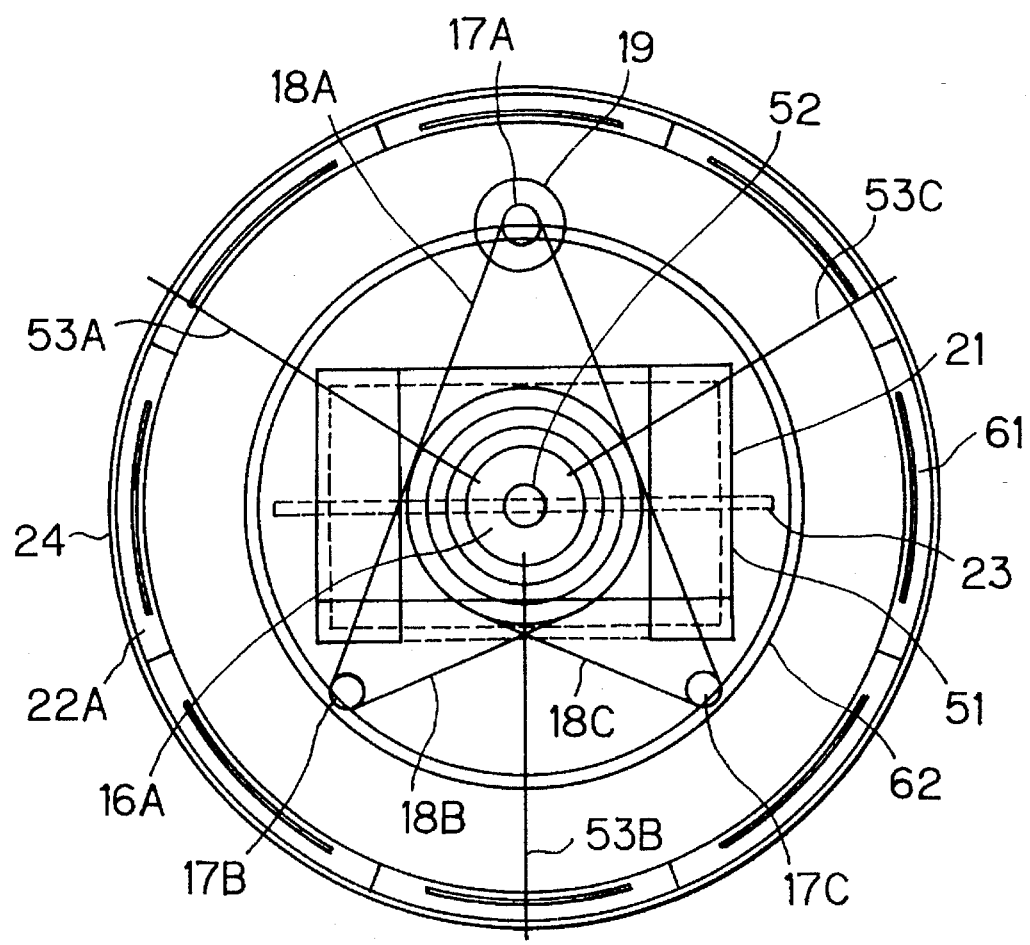
FIG. 25 is a plan view showing the example of FIG. 24.
Figure 26:
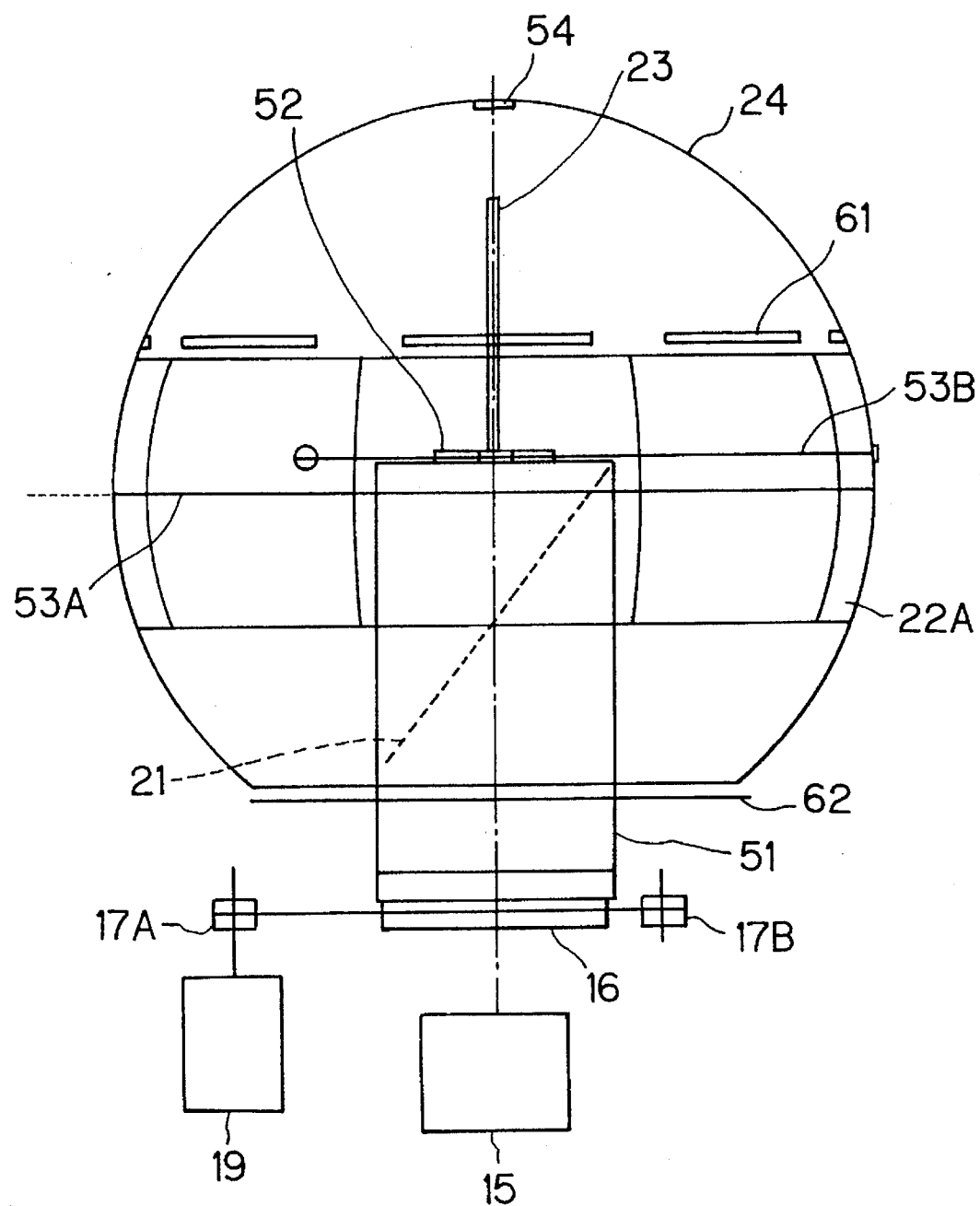
FIG. 26 is a side view showing the example of FIG. 23.
Figure 27:
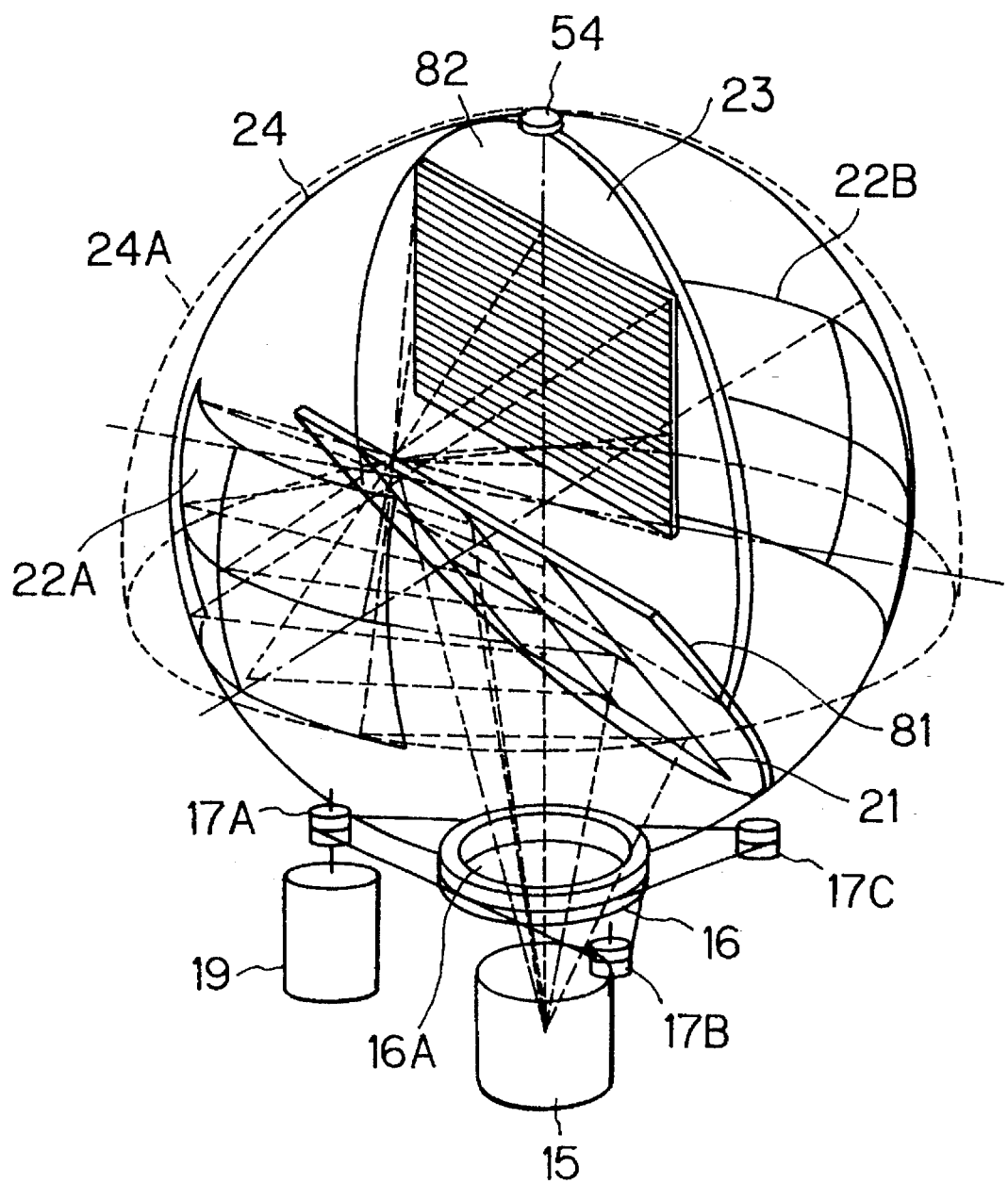
FIG. 27 is a perspective view showing further another structure holding a mirror and a screen of a picture display apparatus of this invention.
Figure 28:
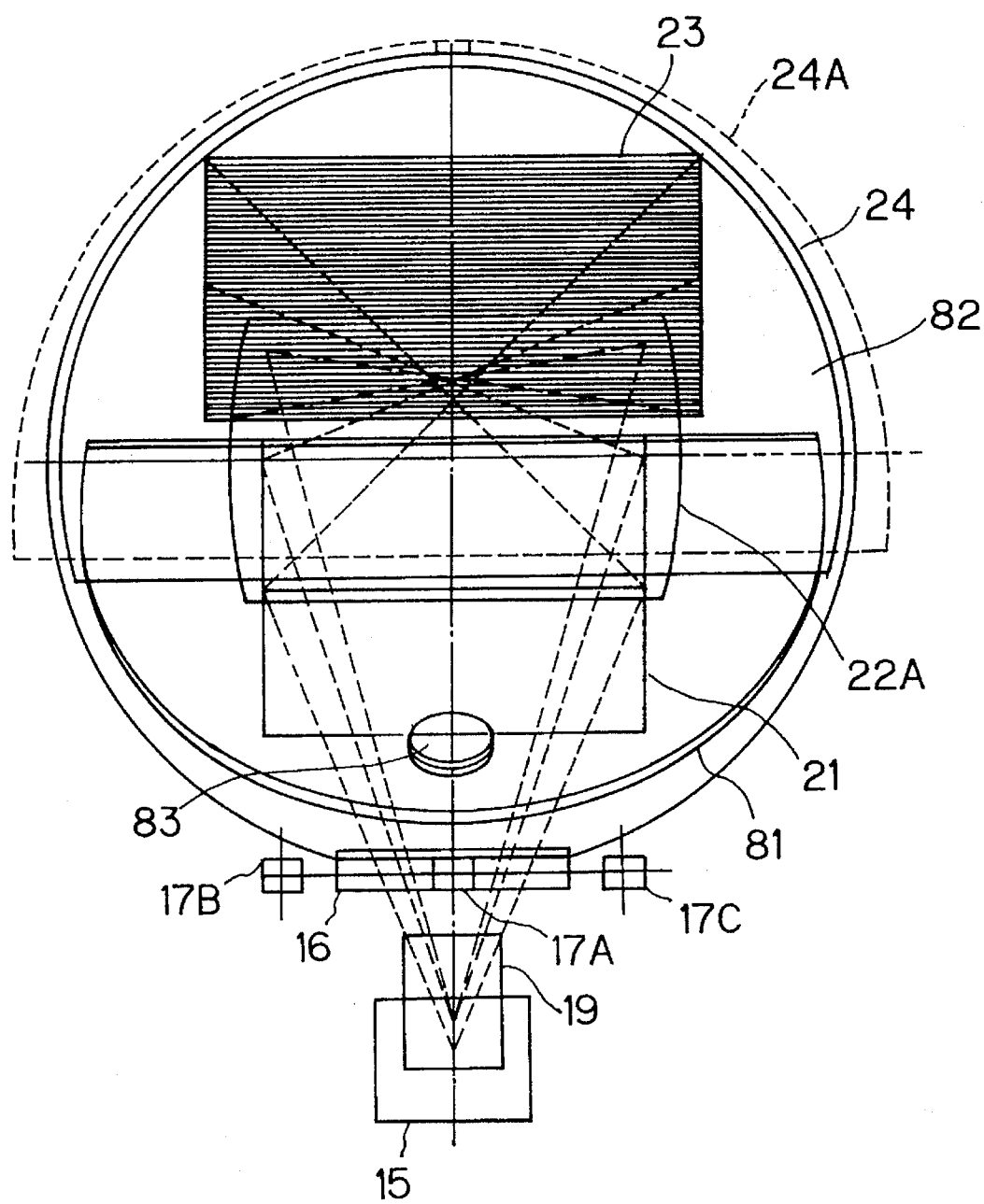
FIG. 28 is a front view showing the example of FIG. 27.
Figure 29:
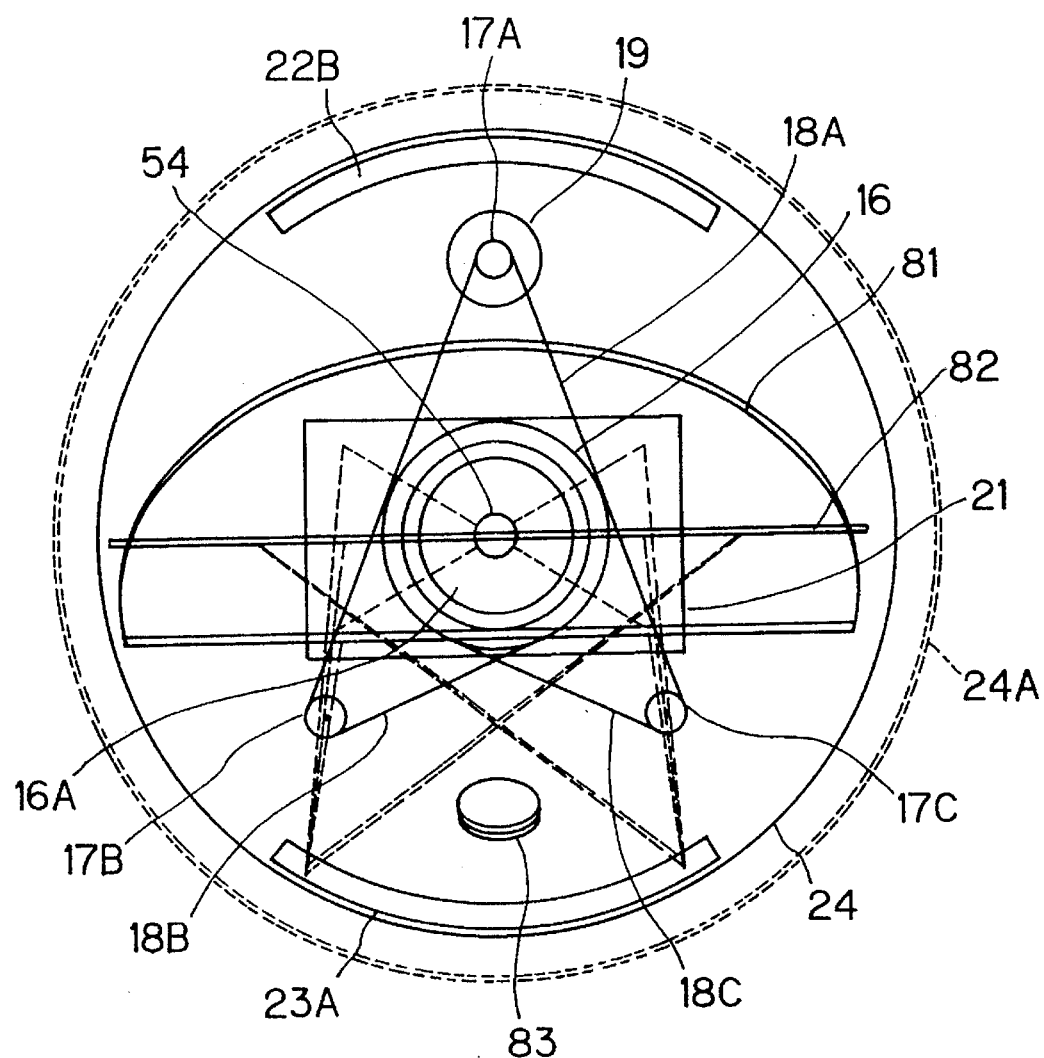
FIG. 29 is a plan view showing the example of FIG. 28.
Figure 30:
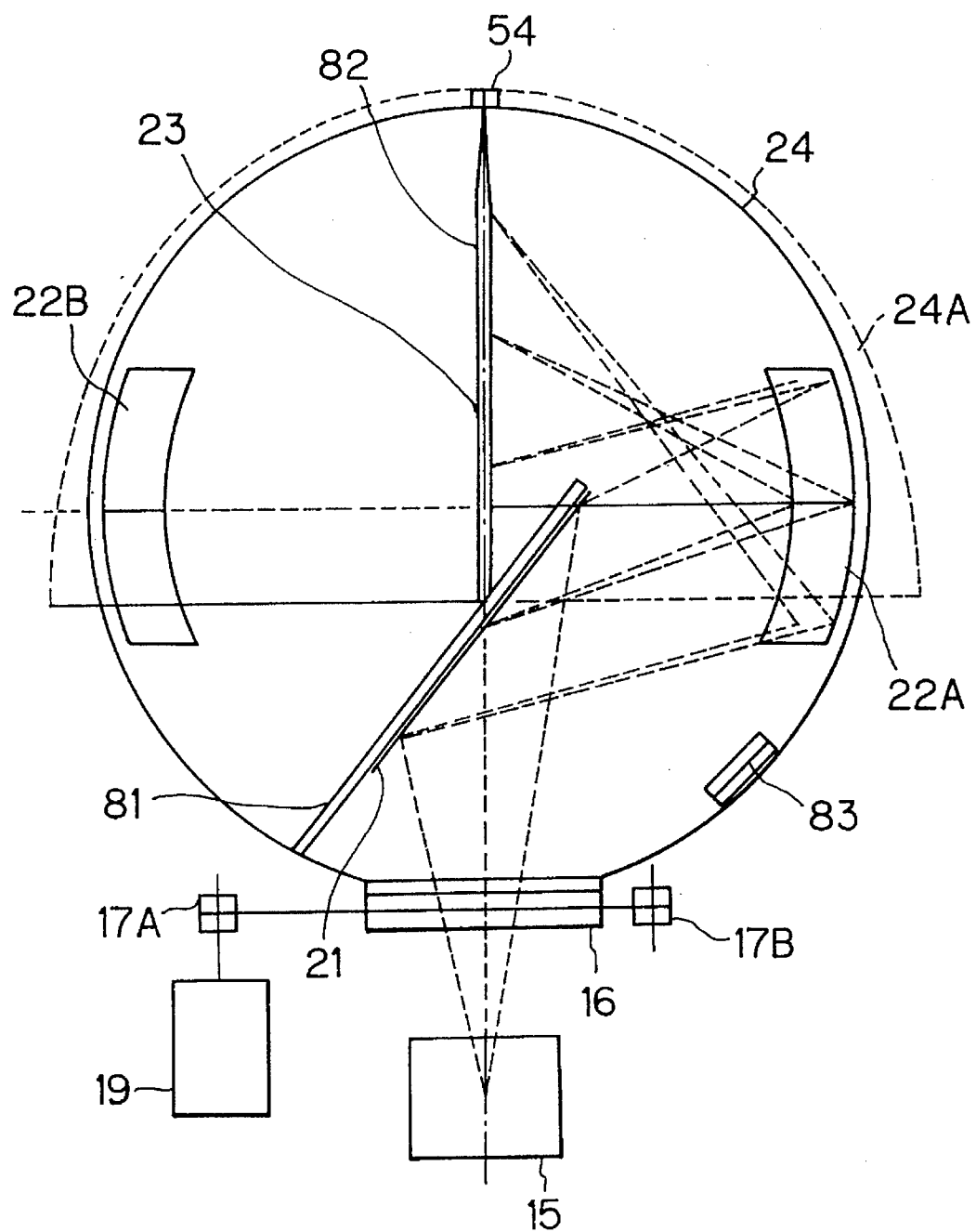
FIG. 30 is a side view showing the example of FIG. 27.

In this example, a correcting lens 31 is provided between the CRT 12R and the projection lens 15 as shown in FIG. 17 and FIG. 18. This correcting lens 31 corrects the difference of optical path length between the light emitted from the center of the CRT 12R and the light emitted from the periphery of the CRT 12R. Therefore when the projection lens 15 and the mirror 22A are disposed so as to put the focus point $F_C$ of the light $L_C$ emitted from the center of the CRT 12R on the screen 23, the focus point $F_R$ of the light $L_R$ emitted from the right side of the CRT 12R and the focus point $F_L$ Of the light $L_L$ emitted from the left side of the CRT 12R are set on the screen 23.

Similarly when the projection lens 15 and the mirror 22A are disposed so as to put the focus point $F_C$ of the light $L_C$ emitted from the center side of the CRT 12R, the focus point $F_U$ of the light $L_U$ emitted from the upper side of the CRT 12R and the focus point $F_L'$ of the light $L_L'$ emitted from the lower side of the CRT 12R are set on the screen 23.

The correcting lenses 31 put in the front of the CRT 12R, 12G and 12B prevent the peripheral picture on the screen 23 from blurring.

FIG. 19, 20, 21 and 22 show an example of structure for revolving the mirror 21 and the screen 23. A box 51 is provided on the annular ring 16. The mirror 21 is provided in the box 51. A middle holder 52 is set at the upper side of this box 51. The screen 23 is set at the upper side of this middle holder 52. The middle holder 52 holds the box 51 and the screen 23, while the box 51 and the screen 23 rotate freely. The middle holder 52 is attached to the dome 24 horizontally by three wires 53A, 53B and 53C. The screen 23 is held by a top holder 54, revolving freely.

When the annular ring 16 rotates, the box 51 attached to the annular ring 16 turns on the middle holder 52 being a supporting point. Because the mirror 21 is provided in the box 51, the mirror 21 also rotates with the box 51. Further because the box 51 is combined with the screen 23, the screen 23 rotates along with the box 51. Because the screen 23 is held by the middle holder 52 and the top holder 54, the screen 23 rotates smoothly.

It is possible to eliminate one of the middle holder 52 and the top holder 54.

FIG. 23, 24, 25 and 26 show another example of structure for revolving the mirror 21 and the screen 23. A lot of slits 61 are provided on the upper periphery of the dome 24. A ring slit 62 is provided on the lower periphery of the dome 24. Other structure is the same as that of FIG. 19, 20, 21 or 22.

When the box 51 (the mirror 21) and the screen 23 rotate, more energy is needed for driving and a noise is generated because of a resistance of surrounding air. Because an air in the dome 24 is discharged from the slit 61 and 62 in this example, a barometric pressure decreases in the dome 24. An air resistance becomes small thereby. A noise generated by an air resistance also becomes small thereby.

FIG. 27, 28, 29 and 30 show further another example of structure for revolving the mirror 21 and the screen 23. A semicircular plate 81 is provided in the dome 24. A mirror 21 is provided on the semicircular plate 81. A semicircular plate 82 is also provided in the dome 24. A screen 23 is provided on the semicircular plate 82. The dome 24 is enclosed. Because the annular ring 16 is fixed to the dome 24, the plate 81 (the mirror 21) and the plate 82 (the screen 23) in the dome 24 rotate along with the dome 24. So it is not necessary to provide the mirror 22A wholly around the dome 24 like a ring. It is the reason that the positional relation of the mirror 21, the screen 23 and the mirror 22A is always fixed in this example.

When the mirror 21 is provided not wholly around the dome 24 but at a part of the dome 24, the weight of the dome 24 is out of balance. So a mirror 22B is provided on the dome 24 for balance. The position of the mirror 22B is symmetrical to the position of the mirror 22A, centering around a rotation axis. The weight of the mirror 22A is the same as that of the mirror 22B. So the dome 24 is balanced at rotation. Further because an observer see the mirror 22A and 22B every ½ circle which have a same shape, a flicker noise is prevented thereby.

The plate 81 is not disposed symmetrically, centering around the rotation axis. So a weight 83 is provided at the opposite side of the plate 81, centering around the rotation axis. The plate 81 and the weight 83 are balanced at rotation.

The mirror 21, 22A, 22B and the screen 23 are disposed in the closed dome. Such as an air resistance against the mirrors and the screen is not generated at a rotation. The air resistance against the dome 24 is only generated at a rotation. But because the shape of the dome 24 is almost sphere, the air resistance becomes very small thereby.

A protection board 24A is provided outside of the dome 24. The protection board 24A prevents an observer from contacting the revolving dome 24 carelessly.

In the above stated examples, the raster is rotated and projected on the revolving screen 23. The following is an example wherein the screen 23 is fixed. Namely a video-camera 204 is provided in a box 202 in FIG. 31. An image of outside of the box 202 is recorded through a mirror 203 by the video-camera 204. The box 202 (the video-camera 204) is rotated by a motor 201. So an image of area of 360° centering around the video-camera 204 is shot. A X-Y scan circuit 205 supplies a synchronizing signal for a scan to the video-camera 204. A video signal output from the video-camera 204 is amplified by a camera amplifier 206, supplied to a VTR 207 and recorded on the VTR. Further this video signal output from this VTR 207 may be recorded on a optical disk. (The video signal output from the video-camera 204 may be recorded on the optical disk directly.)

As such, the recorded video signal is reproduced by the VTR 207 (or an optical disk) and input to a decoder and a amplifier circuit 208. The decoder and the amplifier circuit 208 separate a red(R), a green(G) and a blue(B) signals from the input video signal and supply R,G and B signals respectively to electron guns 11R, 11G and 11B. The decoder and the amplifier circuit 208 separate a synchronizing signal from the input video signal and supply the synchronizing signal to a X-Y raster scan circuit 209. The X-Y raster scan circuit 209 generates a deflection signal for revolving a raster, synchronizing with the input synchronizing signal and supplies the deflection signal to the electron guns 11R, 11G and 11B. Pictures which have been rotated are displayed on the CRT 12R, 12G and 12B, respectively corresponding to the electron guns 11R, 11G and 11B.

The pictures displayed respectively on the CRT 12R, 12G, 12B are composed by dichroic mirrors 13, 14. The composed picture is input to a mirror 21 through a projection lens 15. The light reflected by the mirror 21 is projected on a cylindrical screen 23B which is disposed successively, centering around the mirror 21. The mirror 21 is rotated, synchronizing with the signal output from the X-Y raster scan circuit 209. So the picture is displayed on the screen 23B in an area of 360°. An observer watches this picture inside of the screen 23B.

Figure 31:
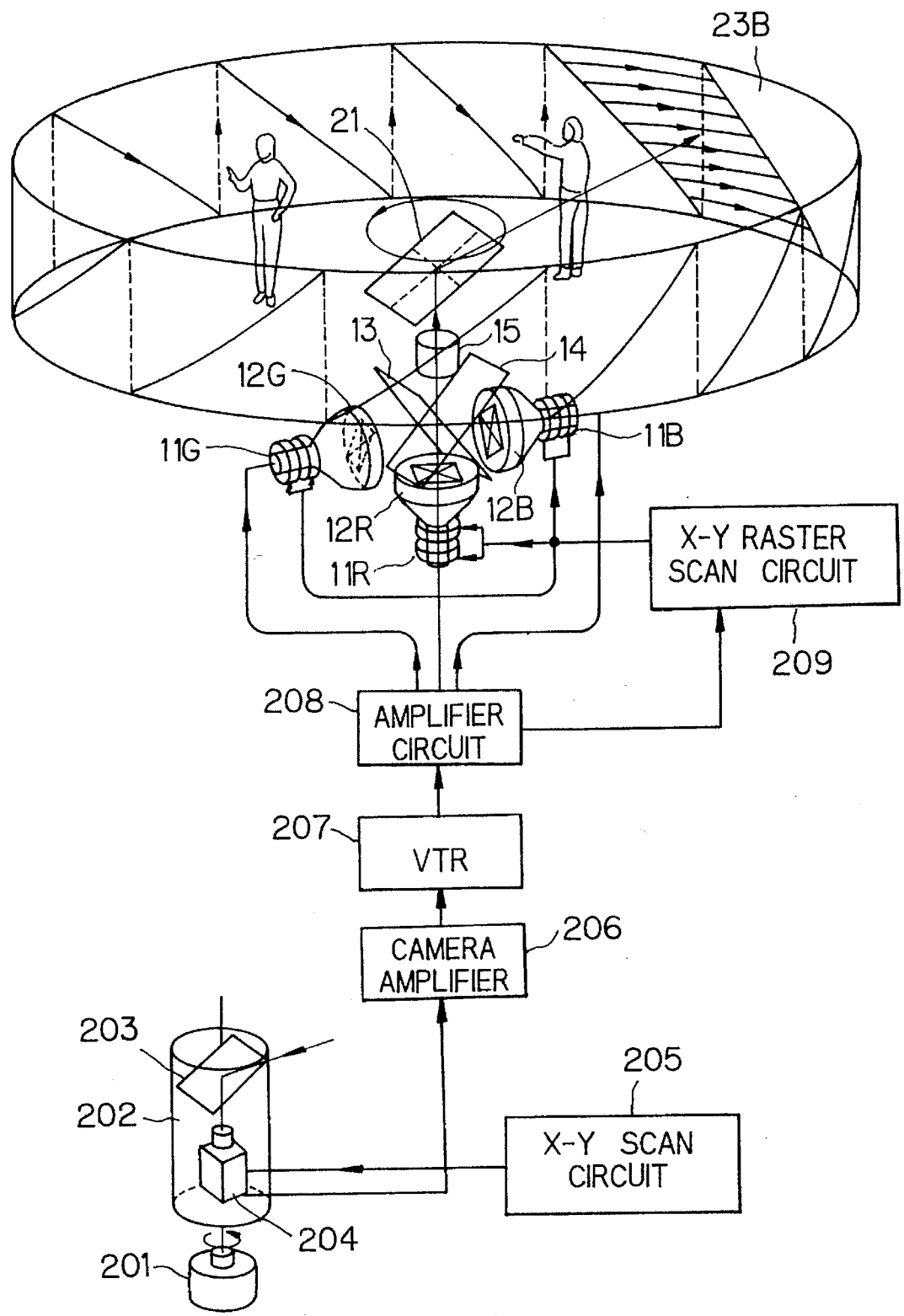
FIG. 31 is a perspective view showing another example of a picture display apparatus of this invention.

Because the mirror 21 rotates at a certain speed, the rectangular raster becomes a rhombus on the screen 23B as shown in FIG. 31. When a raster is rotated only in the vertical direction on the CRT 12R, 12G, 12B, a seamless picture is displayed on the screen 23B. In this case, a vertical frequency $f_V$ is represented by the following formula:

$$f_V = f_R * 5000 \text{(lines/rotation)} = 240 \text{ kHz line}$$

A rotary frequency is represented by $f_R$. When $f_R$ is 48HZ, $f_V$ becomes 240 kHz line / rotation. When $f_V$ is 864Hz (=$f_R*18$ seg/rotation) and $f_H$ is 227 kHz (=$f_V*525/2$), $f_{max}$ becomes 200 MHz.

Figure 32:
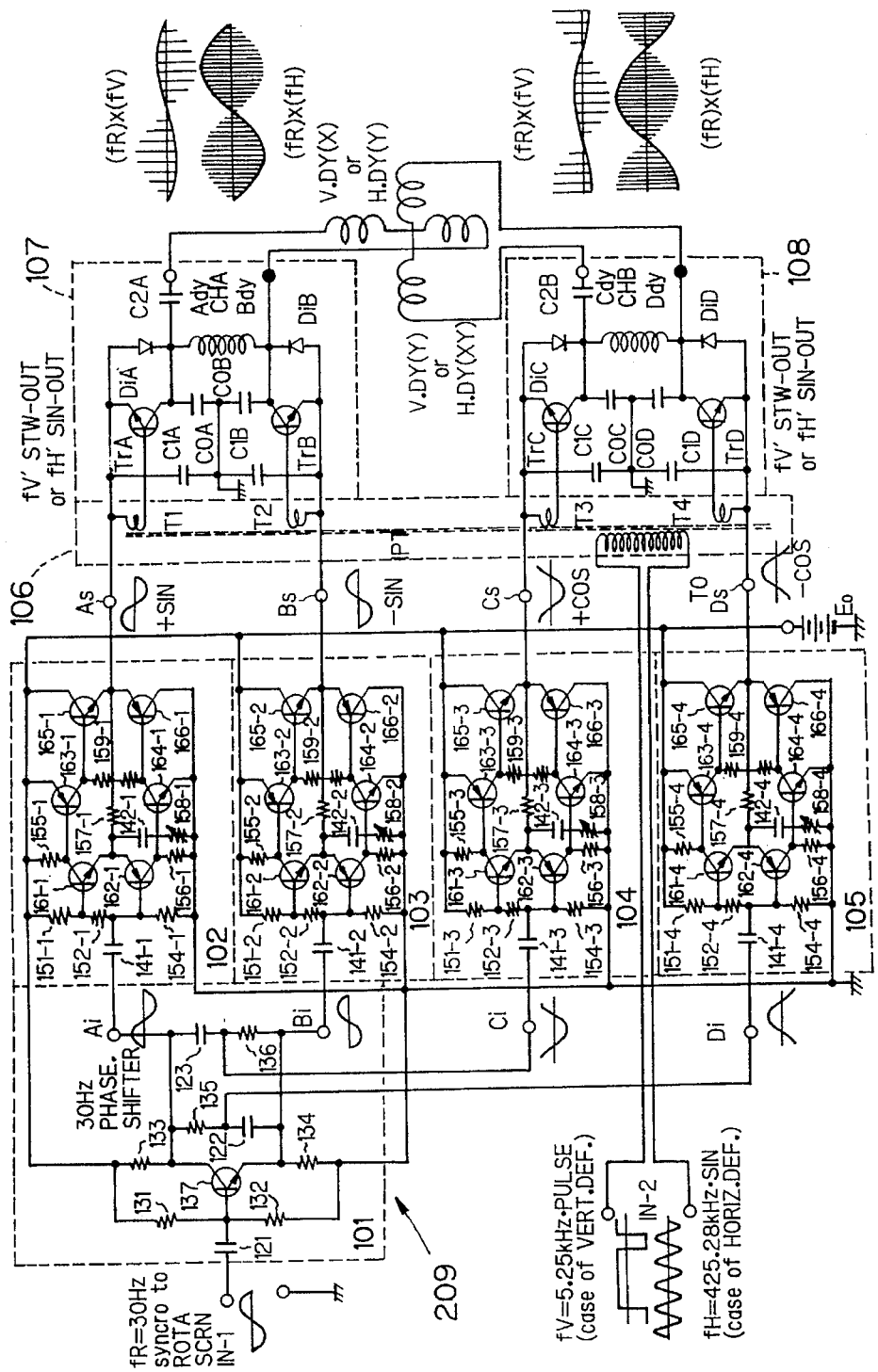
FIG. 32 is a circuit diagram showing a example of a picture revolving display apparatus of this invention.

Next, a structural example of circuit revolving a raster electrically (for example, the X-Y raster scan circuit 209 as shown in FIG. 31) is explained, making reference to FIG. 32. For example, a yoke H. DY(X) deflecting an electron beam in the horizontal direction and a yoke H. DY(Y) deflecting an electron beam in the vertical direction are utilized for scanning a line composing a raster in the electron gun 11R, corresponding to a horizontal scanning signal and a rotary signal. A yoke V. DY(X) deflecting an electron beam in the horizontal direction and a yoke V. DY(Y) deflecting an electron beam in the vertical direction are provided, corresponding to a vertical scanning signal and a rotary signal. Namely this electron gun has one more pair of deflection yokes than a general electron gun has. The electron guns 11G and 11B also have one more pair of deflection yokes.

In FIG. 32, a pair of driving circuits 107 and 108 are only shown for convenience' sake. Actually the two pair of deflection yokes respectively have a pair of driving circuits.

When the deflection yokes V.DY(X) and V.DY(Y) for scanning each line of a raster corresponding to a vertical scanning signal $f_V$ and a rotary signal $f_R$ are driven, a rotary signal of a frequency $f_R$ synchronizing with the rotation of the mirror 21 is input to a phase-shifting circuit 101. A pulse wave of vertical deflection frequency $f_V$ is input to a primary winding $T1_0$ of transducer 106. For example, the frequency $f_R$ is 30 Hz and the frequency $f_V$ is 5.25 KHz.

The phase-shifting circuit 101 is constituted of capacitors 121 and 123, resistors 131 and 136 and a NPN transistor 137. This phase-shifting circuit 101 generates a signal Bi being the same phase as the input signal, a signal Ai being the opposite phase to the signal Bi, a signal Di wherein the input signal is phase-shifted to 90, a signal Ci being the opposite phase to the signal Di.

The signal Ai is amplified by a linear amplification circuit 102 and output as a signal As. The amplification circuit 102 is constituted of capacitors 141-1 and 142-1, resistors 151-1 and 159-1, NPN transistors 161-1, 164-1 and 165-1 and PNP transistors 162-1, 163-1 and 166-1.

The signals Bi, Ci and Di are respectively amplified by a linear amplification circuits 103 and 105 and output as signals Bs, Cs and Ds. The amplification circuits 103 and 105 are constituted like the amplification circuit 102. A constitution element in the amplification circuits 103 and 105 corresponding to an element in the amplification circuit 102 has the same number in front of a hyphen. A number behind a hyphen is same in a same amplification circuit.

When a signal input to the phase-shifting circuit 101 is a negative sine wave (–SIN), the signal Bs becomes a negative sine wave (–SIN) and the signal As becomes a positive sine wave (+SIN). The signal Ds becomes a negative cosine wave (–COS) and the signal Cs becomes a positive cosine wave (+COS).

The signals As and Bs are supplied to a deflection circuit 107 driving the deflection yoke V. DY(X). The signals Cs and Ds are supplied to a deflection circuit 108 driving the deflection yoke V. DY(Y).

The signals As and Bs are respectively supplied to an emitter of a NPN transistor TrA and an emitter of a NPN transistor TrB in the deflection circuit 107. A collector of NPN transistor TrA is connected to a collector of NPN transistor TrB through capacitors C0A and C0B. The emitter of NPN transistor TrA is connected to the emitter of NPN transistor TrB through capacitors C1A and C1B. The connection point between the capacitors C1A and C1B is grounded. The connection point between the capacitors C0A and C0B is also grounded.

A base of NPN transistor TrA is connected to a secondary winding $T_1$ of transducer 106. A base of NPN transistor TrB is connected to a secondary winding $T_2$ of transducer 106.

The NPN transistor TrA is connected in parallel with a diode DiA. The NPN transistor TrB is connected in parallel with a diode DiB. The collectors of NPN transistor TrA and NPN transistor TrB are coupled to a choke coil CHA. The choke coil CHA is connected in parallel with the deflection yoke V. DY(X) through a capacitor C2A.

The deflection circuit 108 is constituted like the deflection circuit 107. The capacitors C1A, C1B, C0A, C0B and C2A of the deflection circuit 107 respectively correspond to capacitors C1C, C1D, C0C, C0D and C2B of the deflection circuit 108. The secondary windings $T_1$ and $T_2$ of the deflection circuit 107 respectively correspond to secondary windings $T_3$ and $T_4$ of the deflection circuit 108. The transistors TrA, TrB, the diodes DiA, DiB and the choke coil CHA of the deflection circuit 107 respectively correspond to transistors TrC, TrD, diodes DiC, DiD and a choke coil CHB of the deflection circuit 108. The choke coil CHB is coupled in parallel with the deflection yoke V. DY(Y).

Figure 33:
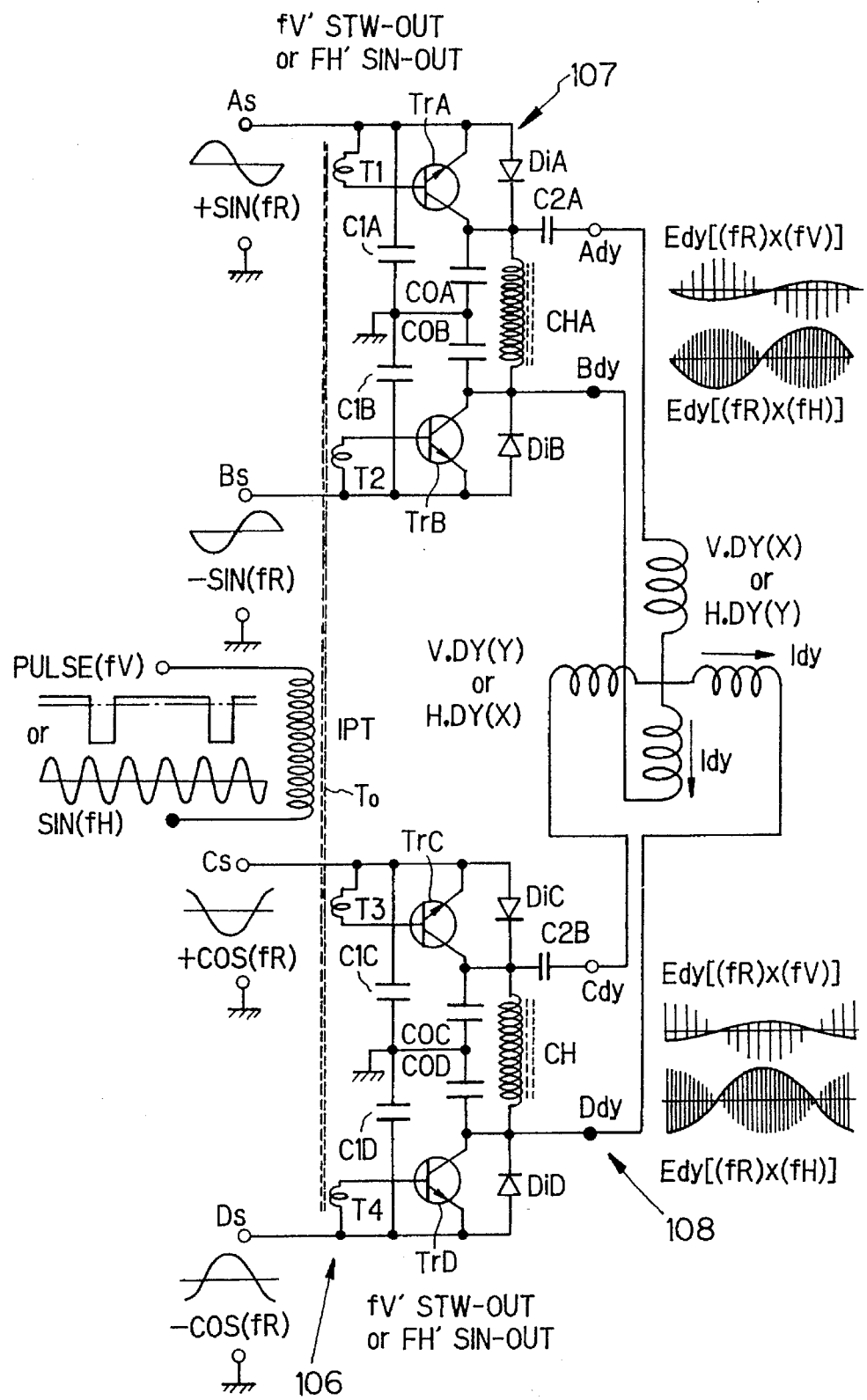
FIG. 33 is a circuit diagram enlarging a part of circuit diagram of FIG. 32.

FIG. 33 is an enlarged view of the transducer 106, the deflection circuits 107, 108 and the deflection yokes V. DY(X), V. DY(Y) in FIG. 32. Next, an operation of this circuit is explained, making reference of FIG. 34.

The diode DiA and the transistor TrB are turned on in a positive half cycle of signal As (+SIN). An electric current is flown by a route of the diode DiA, the choke coil CHA and the transistor TrB thereby. At that time, an electric current Idy is flown to the deflection yoke V. DY(X) through the capacitor C2A. The electric current Idy is increasing when the signal As (+SIN) becomes bigger. The above-stated operation is performed in the term shown by the number 1 in FIG. 34.

A signal corresponding to a pulse $f_V$ applied on the primary winding $T_0$ of transducer 106 is induced to the secondary winding $T_2$ in the term shown by the number 2. A negative voltage is applied on a base of transistor TrB thereby. Because the transistor TrB turns off and the electric current does not flow to the choke coil CHA any more, a positive counter electromotive voltage Edy is generated thereby. The electric current Idy flowing to the deflection yoke V. DY(X) drops suddenly.

In the term shown by the number 3, the counter electromotive voltage Edy generated on the choke coil CHA drops suddenly. The electric current Idy flowing to the deflection yoke V. DY(X) increases in a negative direction at the time.

In the term shown by the number 4, when the negative voltage is not applied from the secondary winding $T_1$ of transducer, the transistor TrA and the diode DiB turn on thereby. So an electric current is flown by a route of the diode DiB, the choke coil CHA and the transistor TrA. The electric current Idy flowing to the deflection yoke V. DY(X) increases from the negative peak in a positive direction gradually.

In the term shown by the number 2, a negative voltage is applied through the secondary winding $T_1$, the transistor TrA turns off. A negative counter electromotive voltage Edy is generated on the choke coil CHA thereby. The electric current Idy flowing to the deflection yoke V. DY(X) becomes from the negative peak to zero.

Figure 34:
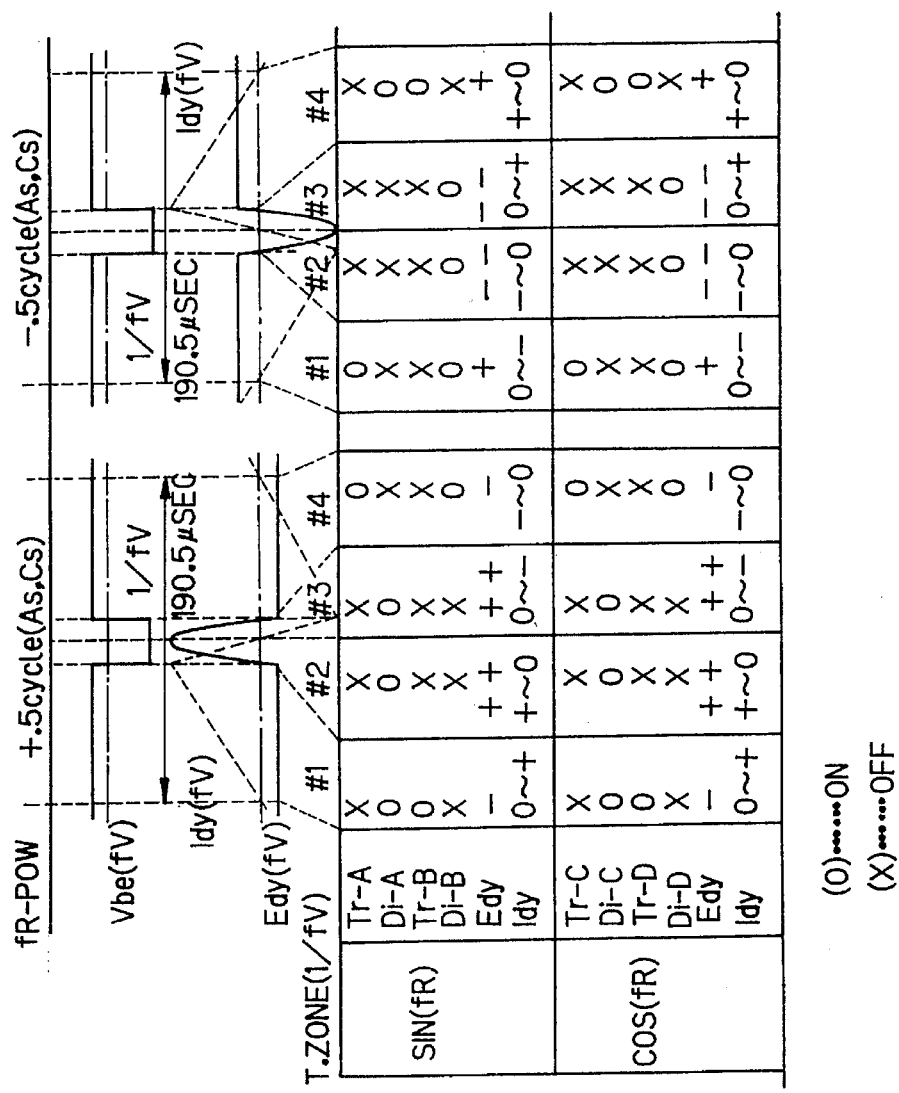
FIG. 34 is a view explaining an operation in the case of supplying a vertical scanning signal and a rotary signal of an example.

In the term shown by the number 4, when the negative voltage is not applied on the secondary winding $T_2$, the transistor TrB and the diode DiA turn on thereby. So an electric current is flown by a route of the diode DiA, the choke coil CHA and the transistor TrB. The electric current Idy flowing to the deflection yoke V. DY(X) decreases from the positive peak (FIG. 34).

The quantity of electric current flowing to the deflection yoke V. DY(X) changes corresponding to the rotary signal $f_R$ (FIG. 33).

The deflection circuit 108 also operates like the deflection circuit 107. Namely the operation on the positive half wave of the signal $C_s$ is the same as the operation on the positive half wave of the signal $A_s$ of the deflection circuit 107. The operation on the negative half wave of the signal $C_s$ is also the same as the operation on the negative half wave of the signal $A_s$ of the deflection circuit 107.

However the signal $C_s$ (+COS) has a phase-shift of 90o to the signal $A_s$ (+SIN) as stated above. So the signal flowing to the deflection yoke V. DY(Y) has a phase-shift of 90° to the electric current flowing to the deflection yoke V. DY(X).

Because the electric current flowing to the deflection yoke V. DY(Y) has a phase-shift of 90° to the electric current flowing to the deflection yoke V. DY(X) and the level of the electric current changes in sine wave corresponding to the rotary signal $f_R$, the deflection direction of electron beam composed by the deflection yoke V. DY(X) and the deflection yoke V. DY(Y) rotates.

Figure 35A:
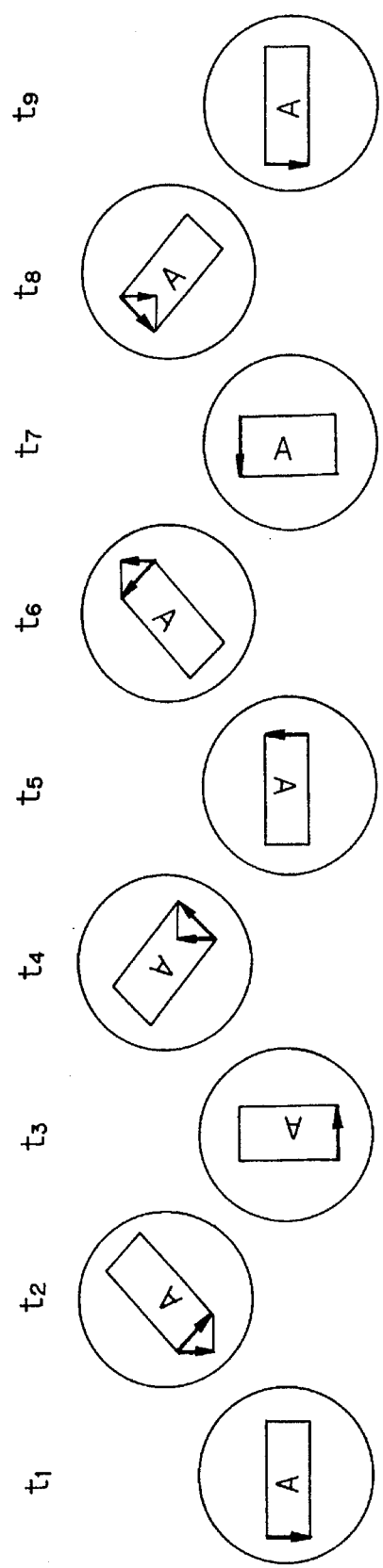
FIG. 35 is a view explaining a principle wherein a raster revolves corresponding to a vertical scanning signal and a rotary signal.
Figure 35B:
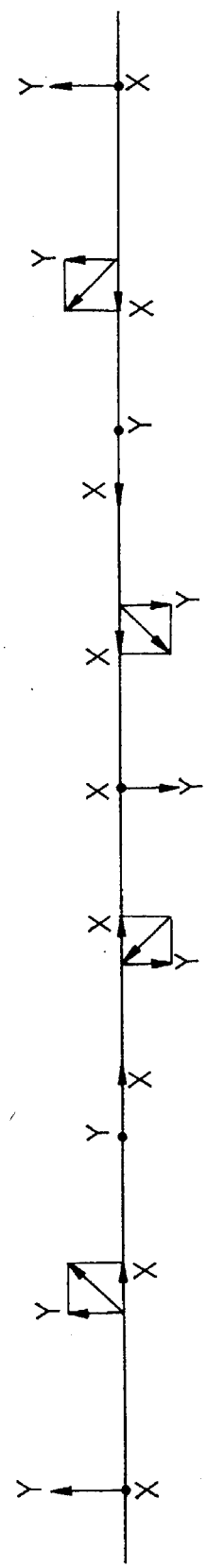

FIG. 35 shows the rotation of deflection direction. The electric current Idy flowing to the deflection yoke V. DY(X) contributes to the rotation of X axis as shown in FIG. 35(b). The electric current gradually increases from zero on the time $t_1$. It becomes a positive peak on the time $t_3$. Then it gradually decreases and becomes zero on the time $t_5$. Further it gradually increases in a negative direction, becomes a negative peak on the time $t_7$ and becomes zero on the time $t_9$.

While the electric current Idy flowing to the deflection yoke V. DY(Y) contributes to the rotation of Y axis as shown in FIG. 35(b). The electric current gradually is a positive peak on the time $t_1$. It gradually decreases and becomes zero on the time $t_3$. Then it gradually increases in a negative direction, becomes a negative peak on the time $t_5$. Further it gradually increases in a positive direction, becomes zero on the time $t_7$ and becomes a positive peak on the time $t_9$.

As a result, raster displayed on the CRT 12R rotates as shown in FIG. 35(a). It is the same as the CRT 12R on the CRT 12G and 12B.

When the circuit diagram shown in FIG. 32 is used for driving the deflection yokes H. DY(X) and H. DY(Y) which deflect a line signal of raster corresponding to a horizontal scanning signal $f_H$ and a rotary signal $f_R$, the rotary signal $f_R$ synchronizing with the rotation is input to a phase-shifting circuit 101. A sine wave which frequency is 425.28 KHz is supplied into the primary winding $T_0$ of transducer 106.

The deflection yoke H. DY(Y) is driven by the deflection circuit 107 as shown in FIG. 33. The deflection yoke H. DY(X) is driven by the deflection circuit 108.

Figure 36:
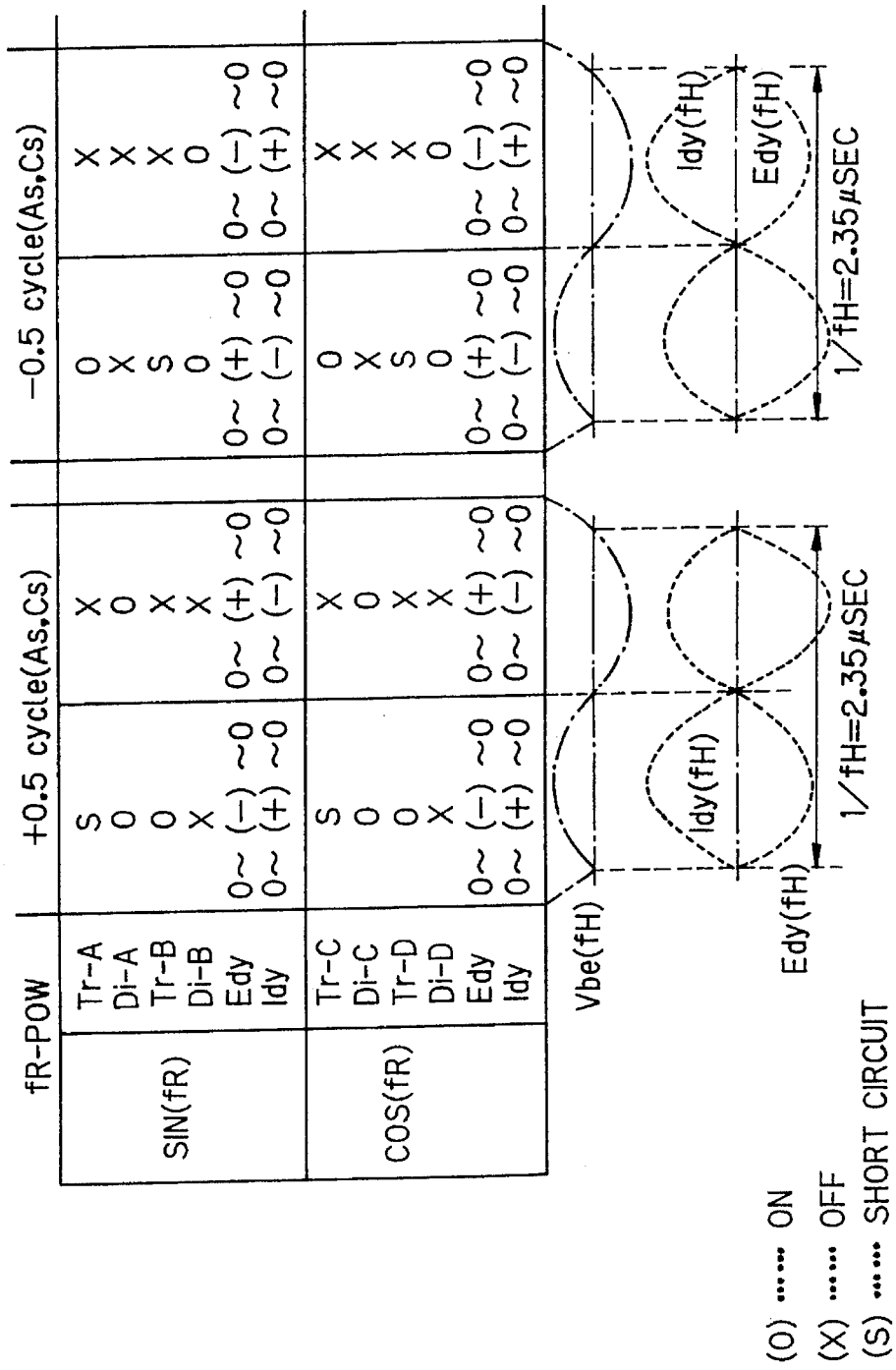
FIG. 36 is a view explaining an operation in the case of supplying a horizontal scanning signal and a rotary signal of an example of FIG. 33.

The operation is explained, making reference to FIG. 36. When a positive half sine wave of horizontal scanning signal $f_H$ is applied to the secondary winding $T_1$ and $T_2$ in the period of a positive half cycle of the signal As, the transistor TrB and the diode DiA turn on. An electric current flows through the diode DiA, the choke coil CHA and the transistor TrB thereby. The transistor TrA is short-circuited through the diode DiA. The voltage Edy generated in the choke coil CHA changes from zero to a negative peak. Then it changes from the negative peak to zero. The electric current Idy flown into the deflection yoke H. DY(Y) changes from zero to a positive peak. Then it changes from the positive peak to zero.

When a negative half sine wave of horizontal scanning signal $f_H$ is applied to the secondary winding $T_1$ and $T_2$ in the period of a positive half cycle of the signal As, the diode DiA keeps to be on. But the transistor TrB turns off. The voltage Edy generated in the choke coil CHA changes from zero to a positive peak. Then it changes from the positive peak to zero. The electric current Idy flown into the deflection yoke H. DY(Y) changes from zero to a negative peak. Then it changes from the negative peak to zero.

When a positive half sine wave of horizontal scanning signal $f_H$ is applied to the secondary winding $T_1$ and $T_2$ in the period of a negative half cycle of the signal As, the transistor TrA and the diode DiB turn on. The transistor TrB is short-circuited through the diode DiB. The electric current Idy flown into the deflection yoke H. DY(Y) changes from zero to a negative peak. Then it changes from the negative peak to zero. The voltage Edy generated in the choke coil CHA changes from zero to a positive peak. Then it changes from the positive peak to zero. Changes from zero to a positive peak.

When a negative half sine wave of horizontal scanning signal $f_H$ is applied to the secondary winding $T_1$ and $T_2$ in the period of a negative half cycle of the signal As, the transistors TrA and Tr turn off. The electric current Idy flown into the deflection yoke H. DY(Y) changes from zero to a positive peak. Then it changes from the positive peak to zero. The voltage Edy generated in the choke coil CHA changes from zero to a negative peak. Then it changes from the negative peak to zero.

The operation on which the signal Cs is in a period of positive half cycle and a period of negative half cycle on the deflection circuit 108 is the same operation as the operation on which the signal As is in a period of positive half cycle and a period of negative half cycle on the deflection circuit 107 (FIG. 36).

The phase-shift between the signal As and the signal Cs is 90°. The levels of the signals respectively change as a sine wave. So the deflection direction synthesized by the deflection yokes H. DY(X) and H. DY(Y) rotates.

Figure 37A:
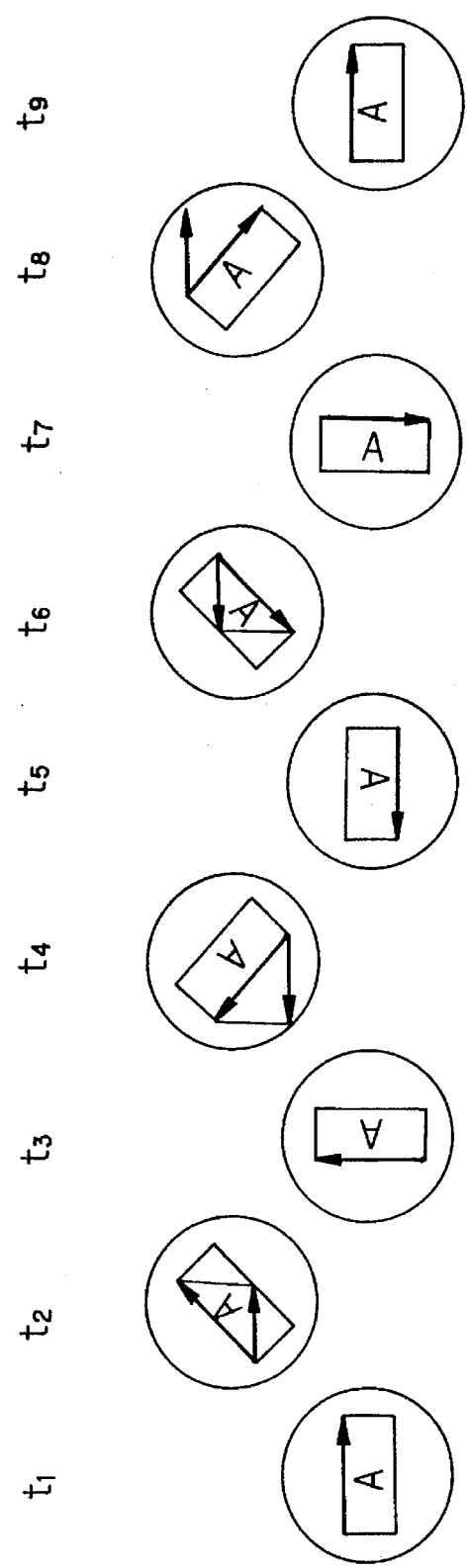
FIG. 37 is a view explaining a principle wherein a raster revolves corresponding to a horizontal scanning signal and a rotary signal.
Figure 37B:
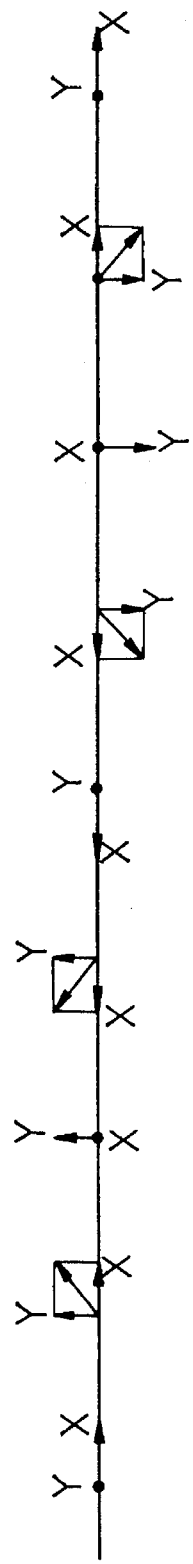
Figure 38:
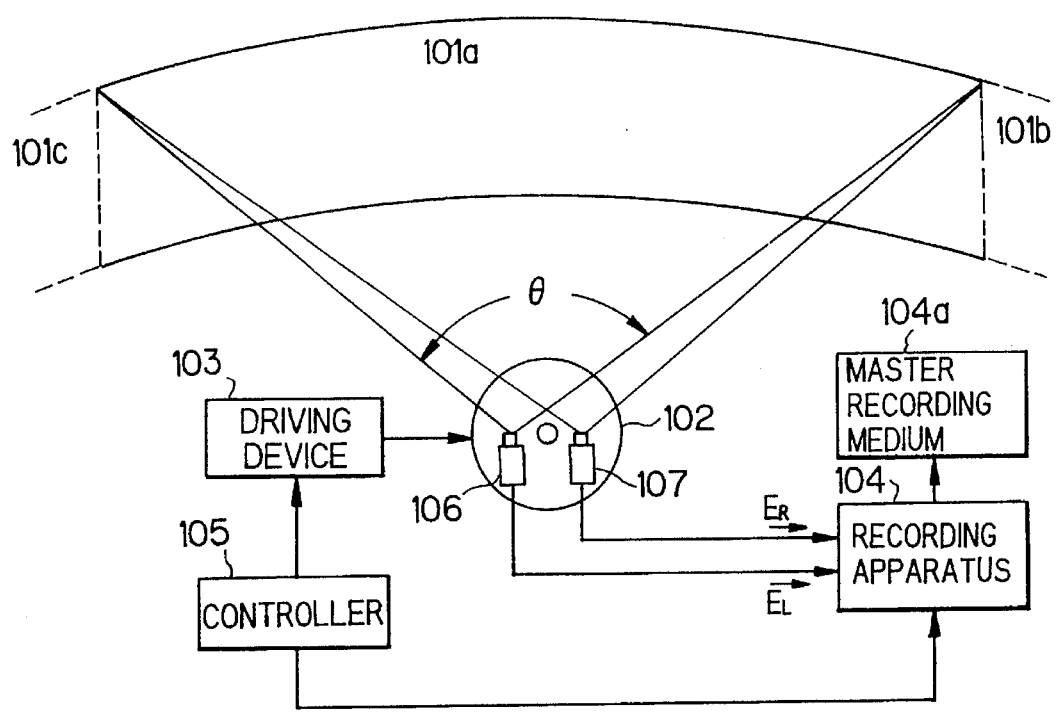
FIG. 38 is a block diagram showing a conventional stereoscopic picture recording apparatus.

FIG. 37 shows the rotation of deflection direction. The electric current Idy flowing to the deflection yoke H. DY(X) contributes to the rotation of X axis as shown in FIG. 37(b). The electric current gradually decreases from a positive peak on the time $t_1$. It becomes zero on the time $t_3$. Then it gradually increases in a negative direction, becomes a negative peak on the time $t_5$ and becomes zero on the time $t_7$. Further it gradually increases in a positive direction and becomes a positive peak on the time $t_9$ again.

While the electric current Idy flowing to the deflection yoke H. DY(Y) contributes to the rotation of Y axis as shown in FIG. 37(b). The electric current is zero on the time $t_3$. It gradually increases and becomes a positive peak on the time $t_3$. Then it gradually increases in a negative direction, becomes zero on the time $t_5$. Further it gradually increases in a negative direction, becomes a negative peak on the time $t_7$ and becomes zero on the time $t_9$.

So the deflection direction synthesized by the deflection directions of X axis and Y axis rotates as shown in FIG. 37(b). As a result, each line constituting a raster rotates as shown in FIG. 37(a).

This invention is applied to a stereoscopic radar, a stereoscopic CT scanning apparatus and a stereoscopic CAD (CG picture display apparatus).

While this invention has been described in conjunction with specific embodiments, it is evident that many alternatives, modifications, permutations and variations will become apparent to those skilled in the art in light of the foregoing description. Accordingly, it is intended that the present invention embraces all such alternatives, modifications and variations as fall within the scope of the appended claims.

What is claimed is:

1. A picture display apparatus, which comprises:
   a picture generating device for generating a rotating picture;
   a rotatable mirror for rotating on a rotary axis;
   a cylindrical screen disposed around said rotary axis of said rotatable mirror; and
   a projection lens for projecting said rotating picture to said screen, said projection lens being disposed between said picture generating device and said rotary mirror.

2. The picture display apparatus according to claim 1, wherein said picture generating device includes:
   a first pair of deflection yokes deflecting an electron beam in a horizontal direction and in a vertical direction;
   a second pair of deflection yokes deflecting the electron beam in a horizontal direction and in a vertical direction;
   a first deflection circuit for driving said first deflection yokes corresponding to a horizontal scanning signal and a rotary signal indicative of a frequency of rotation of an optical element for transmitting an image produced by said electron beam; and
   a second deflection circuit driving said second deflection yokes corresponding to a vertical scanning signal and said rotary signal.

3. A picture display apparatus, comprising:
   a picture generating device for generating a rotating picture, said picture generating device including
      a first pair of deflection yokes deflecting an electron beam in a horizontal direction and in a vertical direction;
      a second pair of deflection yokes deflecting the electron beam in a horizontal direction and in a vertical direction;
      a first deflection circuit for driving said first deflection yokes corresponding to a horizontal scanning signal and a rotary signal indicative of a frequency of rotation of an optical element for transmitting an image produced by said electron beam; and
      a second deflection circuit driving said second deflection yokes corresponding to a vertical scanning signal and said rotary signal;
   a rotatable mirror for rotating on a rotary axis;
   a cylindrical screen disposed around said rotary axis of said rotatable mirror; and
   a projection lens for projecting said rotating picture to said screen, said projection lens being disposed between said picture generating device and said rotary mirror.

* * * * *